United States Patent
Tago et al.

(10) Patent No.: US 9,979,329 B2
(45) Date of Patent: May 22, 2018

(54) POWER CONVERTING DEVICE AND POWER CONVERTING SYSTEM

(71) Applicant: DENSO CORPORATION, Kariya, Aichi-pref. (JP)

(72) Inventors: Masakazu Tago, Aisai (JP); Harumi Horihata, Nagoya (JP); Hideaki Nakayama, Tokoname (JP)

(73) Assignee: DENSO CORPORATION, Kariya (JP)

(*) Notice: Subject to any disclaimer, the term of this patent is extended or adjusted under 35 U.S.C. 154(b) by 87 days.

(21) Appl. No.: 14/504,886

(22) Filed: Oct. 2, 2014

(65) Prior Publication Data
US 2015/0091481 A1 Apr. 2, 2015

(30) Foreign Application Priority Data

Oct. 2, 2013 (JP) .................................. 2013-207184

(51) Int. Cl.
| | |
|---|---|
| H02P 23/14 | (2006.01) |
| H02P 8/14 | (2006.01) |
| H02P 6/12 | (2006.01) |
| H02P 6/00 | (2016.01) |
| H02P 6/28 | (2016.01) |
| H02P 101/45 | (2016.01) |

(52) U.S. Cl.
CPC ............... *H02P 6/002* (2013.01); *H02P 6/28* (2016.02); *H02P 2101/45* (2015.01)

(58) Field of Classification Search
CPC ............... H02P 6/001; H02P 7/29; H02P 9/10
See application file for complete search history.

(56) References Cited

U.S. PATENT DOCUMENTS

| | | | |
|---|---|---|---|
| 2011/0057591 A1* | 3/2011 | Tagome | B60L 11/123 318/400.23 |
| 2012/0081083 A1* | 4/2012 | Horihata | H02P 9/48 322/99 |
| 2012/0249024 A1* | 10/2012 | Saha | H02P 21/06 318/400.02 |

(Continued)

FOREIGN PATENT DOCUMENTS

| | | |
|---|---|---|
| JP | 2008-92739 | 4/2008 |
| JP | 5174617 | 1/2013 |

OTHER PUBLICATIONS

Office Action (3 pgs.) dated Jul. 30, 2015 issued in corresponding Japanese Application No. 2013-207184 with an at least partial English language translation (5 pgs.).

*Primary Examiner* — Eduardo Colon Santana
*Assistant Examiner* — Charles S Laughlin
(74) *Attorney, Agent, or Firm* — Nixon & Vanderhye P.C.

(57) ABSTRACT

In a power converting device, a controller determines a combination pattern of a first energization pattern for the first set of the at least one-phase winding and a second energization pattern for the second set of the at least one-phase winding. The first and second energization patterns respectively include at least a first energization duration for the first set of the at least one-phase winding and a second energization duration for the second set of the at least one-phase winding. The controller supplies a drive pulse signal, whose on duration is based on the determined combination pattern, to the switch to thereby control on-off operations of the switch.

13 Claims, 16 Drawing Sheets

(56) References Cited

U.S. PATENT DOCUMENTS

2013/0200827 A1* 8/2013 Kezobo ................ H02P 29/021
    318/400.21
2013/0257332 A1* 10/2013 Nakano ................ H02K 11/001
    318/490
2013/0264981 A1* 10/2013 Taniguchi .............. B62D 5/046
    318/400.26

* cited by examiner

POWER CONVERTING DEVICE AND POWER CONVERTING SYSTEM

CROSS REFERENCE TO RELATED APPLICATIONS

This application is based on and claims the benefit of priority from Japanese Patent Application 2013-207184 filed on Oct. 2, 2013, the disclosure of which is incorporated in its entirety herein by reference.

TECHNICAL FIELD

The present disclosure relates to power converting devices each equipped with a plurality of power converters and one or more controllers for controlling the power converters. The present disclosure also relates to power converting systems each equipped with at least one of the power converting devices and a rotary electric machine.

BACKGROUND

Rotary electric machines, such as motor-generators, ISGs (Integrated Starter Generators), and so on, are operative to output, based on controlled AC (Alternating Current) power generated from DC (Direct Current) power supplied from a power source, torque, power, or the like. Power converters, such as inverters, are used to generate controlled AC power based on input DC power supplied thereto from the power source in order to control these controlled variables of the rotary electric machines.

PWM (Pulse Width Modulation) control or pulse control are known for a power converter, i.e. an inverter, to control AC power supplied to a rotary electric machine. For example, PWM control and pulse control are applied to an inverter for controlling AC power supplied to an ISG or a motor-generator in combination or alone.

PWM control applied to an inverter has higher controllability for input current. Particularly, PWM control applied to an inverter is capable of controlling the level of input current from a battery, i.e. a DC power source, when the rotational speed of the rotor of a controlled rotary electric machine is zero, i.e. the rotor of the controlled rotary electric machine is at a standstill or is stopped. However, PWM control applied to an inverter may necessitate a relatively high-capacitance capacitor connected to the input of the inverter to absorb ripples generated during PWM control, resulting in an increase of the inverter in size.

In contrast, pulse control, i.e. rectangular-wave control, applied to an inverter has no need of such a relatively high-capacitance capacitor connected to the input of the inverter because of few ripples generated during pulse control, resulting in the inverter having a smaller size.

However, pulse control applied to an inverter may have lower controllability for input current when driving a controlled rotary electric machine via the inverter with the rotational speed of the rotor of the controlled rotary electric machine being zero. This may result in a high level of current being pulled from a battery into the inverter, thus dropping the battery's voltage. The drop of the battery's voltage may have negative effects on other components operating based on the battery's voltage.

In addition, wires connected among the battery, the inverter, and the controlled rotary electric machine may have a relatively large thickness enough to permit such a high level current to flow therethrough, resulting in an increase of the wires in weight and in difficulty of wiring work using the wires. The inverter and the controlled rotary electric machine also have normal rated power enough to be acceptable thereby, resulting in an increase of the inverter and the controlled rotary electric machine in size.

Particularly, let us consider that pulse control is applied to an inverter installed in a motor vehicle that has a limited power-supply capacity. In this case, pulse control may have to ensure a minimum voltage of a power supply based on the battery if other components, such as an engine ECU (Electronic Control Unit), an EPS (Electronic Power Steering), brakes, and so on, are electrically connected to the same battery in addition to the inverter. This is because if the minimum voltage of the power supply were not ensured, this might deteriorate the fundamental operations of the vehicle, such as running, turning, and stopping. In order to reliably operate the other components, a step-up DC-DC converter and/or current-suppression relays may be provided in the motor vehicle. However, this may increase the total cost of the motor vehicle and/or necessitate, in the motor vehicle, an additional space for installation of the DC-DC converter and/or current-suppression relays.

On the other hand, there is known an example of power converting systems, i.e. rotary electric-machine systems, for improving the controllability of a rotary electric machine equipped with a single set of three-phase windings, which is disclosed in Japanese Patent Publication No. 5174617.

The power converting system disclosed in the Patent Publication sets a plurality of mode-state quantities of parameters for each of operation modes of the rotary electric machine; the plurality of mode-state quantities of the parameters are used to obtain information about a switching pattern for turning on or off switching elements of the inverter.

The power converting system performs a method of driving the inverter using the plurality of mode-state quantities as follows.

Specifically, the method obtains the mode-state quantities of the parameters for an actual operating mode of the rotary electric machine. Then, the method generates, based on PWM control or pulse control, turn-on and turn-off instructions for the respective switching elements of the inverter based on the obtained mode-state quantities of the parameters for the actual operating mode of the rotary electric machine.

SUMMARY

The Patent Publication however merely discloses a specific method of driving the inverter to thereby control the rotary electric machine equipped with a single set of three-phase windings. Specifically, applying the specific method to a power converting system including a rotary electric machine equipped with plural sets of plural-phase windings, such as two sets of three-phase windings, may result in:

an increase of the inverter in size when the specific method drives the inverter based on PWM control; and a high level of current being pulled from the battery into the inverter when the specific method drives the inverter based on pulse control with the rotational speed of the rotor of the controlled rotary electric machine being zero.

The specific method disclosed in the Patent Publication may therefore have difficulty satisfying both reduction of the inverter in size and reduction of current being pulled from the battery into the inverter while the rotational speed of the rotor of the controlled rotary electric machine is zero.

In view of the circumstances set forth above, one aspect of the present disclosure seeks to provide power converting devices and power converting systems, which have a capacity of addressing the problem set forth above.

Specifically, an alternative aspect of the present disclosure aims to provide such a power converting device and such a power converting system equipped with a power converting device, each of which is capable of satisfying both reduction of the power converting device and reduction of current being pulled from a power source into the power converting device.

According to a first exemplary aspect of the present disclosure, there is provided a power converting device for converting input power supplied from a power source, and supplying converted power to a rotary electric machine, the rotary electric machine including at least a first set of at least one-phase winding and a second set of at least one-phase winding. The power converting device includes a switch connected between the power source and each of the first set of the at least one-phase winding and the second set of at least one-phase winding and switched on or off when controlled. The power converting device includes a controller that determines a combination pattern of a first energization pattern for the first set of the at least one-phase winding and a second energization pattern for the second set of the at least one-phase winding. The first energization pattern includes at least a first energization duration for the first set of the at least one-phase winding, and the second energization pattern includes at least a second energization duration for the second set of the at least one-phase winding. The controller supplies a drive pulse signal, whose on duration is based on the determined combination pattern, to the switch to thereby control on-off operations of the switch.

According to a second exemplary aspect of the present disclosure, there is provided a power converting system. The power converting system includes a rotary electric machine including at least a first set of at least one-phase winding and a second set of at least one-phase winding; and a power converting device for converting input power supplied from a power source, and supplying converted power to the rotary electric machine. The power converting device includes a switch connected between the power source and each of the first set of the at least one-phase winding and the second set of at least one-phase winding and switched on or off when controlled. The power converting device includes a controller that determines a combination pattern of a first energization pattern for the first set of the at least one-phase winding and a second energization pattern for the second set of the at least one-phase winding. The first energization pattern includes at least a first energization duration for the first set of the at least one-phase winding, and the second energization pattern includes at least a second energization duration for the second set of the at least one-phase winding. The controller supplies a drive pulse signal, whose on duration is based on the determined combination pattern, to the switch to thereby control on-off operations of the switch.

The power converting device according to each of the first and second exemplary aspects supplies the drive pulse signal, whose on duration is based on the determined combination pattern, to the switch to thereby control on-off operations of the switch. This adjusts an impedance of a path through which an input current supplied from the power source flows. The path includes at least one of the first set of the one-phase winding and the second set of the one-phase winding according to the determined combination pattern. This makes it possible to control, i.e. reduce, a level of the input current to be input to the power converting device from the power source, thus improving the controllability of the input current.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
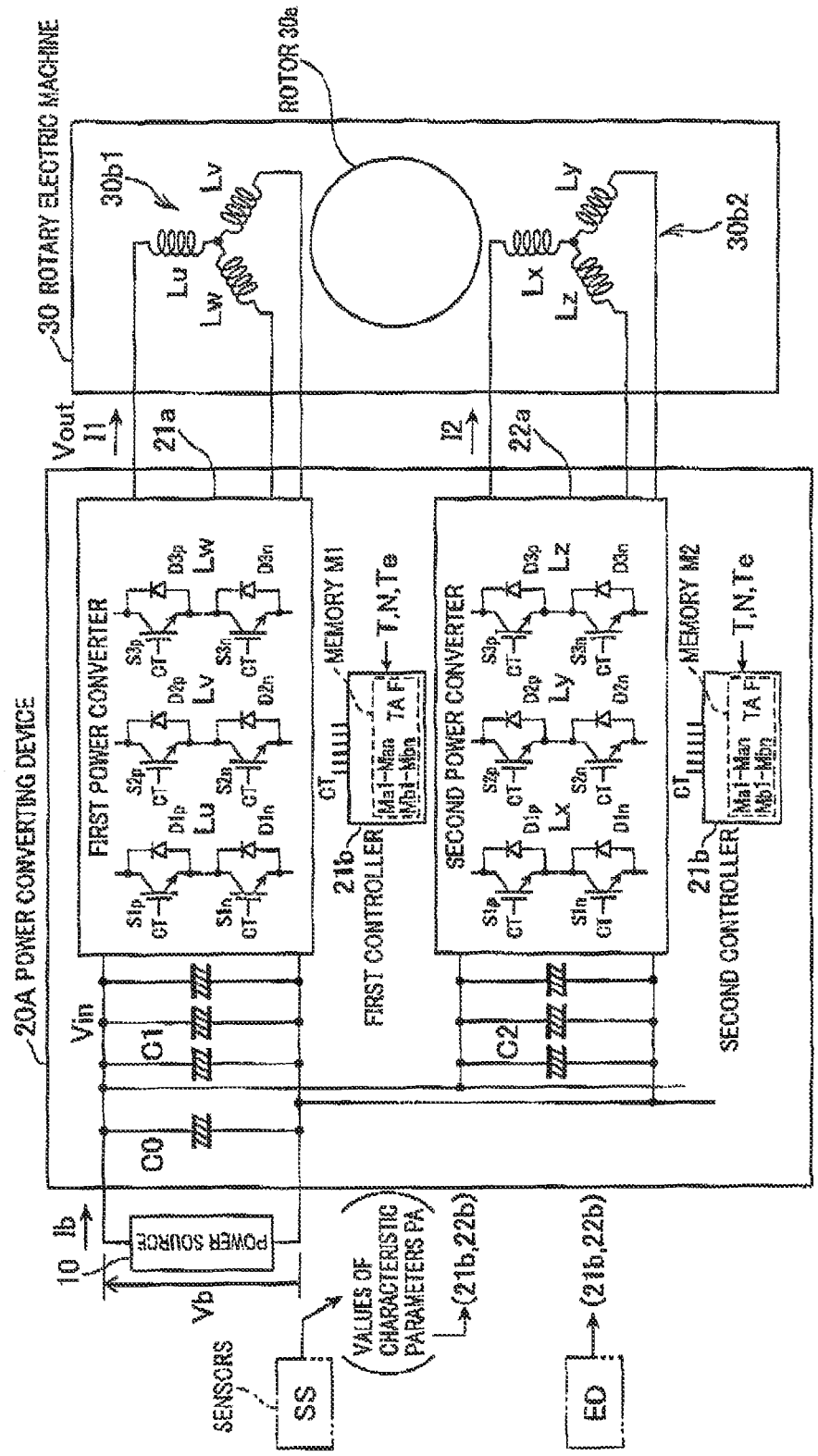
FIG. 1 is a schematic circuit diagram of a power converting system including a power converting device and a rotary electric machine according to a first embodiment of the present disclosure.

Embodiments of the present disclosure will be described hereinafter with reference to the accompanying drawings. In the embodiments, like parts between the embodiments, to which like reference characters are assigned, are omitted or simplified to avoid redundant description. In the embodiments, the phrase "A is/are connected to B" or the similar expressions represents that A is/are electrically connected to B unless otherwise described. If directions, such as upper, lower, left, and right directions, are described in the specification, they are defined based on corresponding directions illustrated in the accompanying drawings.

First Embodiment

First, a power converting device 20A according to a first embodiment of the present disclosure will be described with reference to FIGS. 1 to 23.

Referring to FIG. 1, there is illustrated the power converting device 20A. The power converting device 20A is operative to convert a variable input voltage as an example of input power into a required output voltage Vout as an example of converted power. The power converting device 20A is also configured to supply the output voltage Vout to a rotary electric machine 30.

Specifically, in the first embodiment, the power converting device 20A and the rotary electric machine 30 constitute a power converting system 100A.

The power converting device 20A is connected to a power source 10 serving as a power source of the input power to the power converting device 20A. As the power source 10, a secondary battery for outputting a voltage Vb is used. An available chargeable and dischargeable battery can be used as the power source 10. Particularly, a lithium-ion secondary battery, which is a type of non-aqueous electrolyte secondary battery, is used as the power source 10 according to the first embodiment.

As the rotary electric machine 30, a motor-generator is used according to the first embodiment. For example, the rotary electric machine 30 according to the first embodiment is equipped with a rotor 30a having a preset pair(s) of magnetic poles, i.e. a preset pair(s) of N and S poles, and a first set 30b1 of three-phase windings, and a second set 30b2 of three-phase windings.

The first set 30b1 of three-phase windings is comprised of U-, V-, and W-phase windings Lu, Lv, and Lw, and the second set 30b2 of three-phase windings is comprised of X-, Y-, and Z-phase windings Lx, Ly, and Lz. For example, each of the three-phase windings Lu, Lv, and Lw has one end connected to a common junction, i.e. a neutral point, and the other end to a separate terminal in, for example, star(Y)-configuration.

Similarly, each of the three-phase windings Lx, Ly, and Lz has one end connected to a common junction, i.e. a neutral point, and the other end to a separate terminal in, for example, star(Y)-configuration.

The three-phase windings Lu, Lv, and Lw are wound in and around a cylindrical stator core. For example, the stator core has an annular shape in its lateral cross section, and a plurality of slots formed therethrough and circumferentially arranged at given pitches. The three-phase windings Lu, Lv, and Lw are wound in the slots of the stator core. Similarly, the three-phase windings Lx, Ly, and Lz are wound in the slots of the stator core such that the three-phase windings Lu, Lv, and Lw and three-phase windings Lx, Ly, and Lz have a phase difference of 30 electrical degrees ($\pi/6$ radians) therebetween. The first and second sets of the three-phase windings (Lu, Lv, Lw) and (Lx, Ly, Lz) are connected in parallel to each other, and the first and second sets of the three-phase windings (Lu, Lv, Lw) and (Lx, Ly, Lz) and the stator core constitute a stator of the power generator 30.

Note that how to connect the three-phase windings Lu, Lv, and Lw to each other and how to connect the three-phase windings Lx, Ly, and Lw to each other can be freely determined as long as the differences in phase between the three-phase windings Lu, Lv, and Lw (Lx, Ly, and Lw) are $2\pi/3$ radian.

Specifically, the rotary electric machine 30 is configured such that the rotor 30$a$ turns based on magnetic relationships between a rotating magnetic field induced in each set 30$b$1, 30$b$2 of the three-phase windings being energized and the magnetic poles of the rotor 30$a$.

The power converting device 20A includes a plurality of power converters, the number of which matches the number of sets of the phase windings. That is, in the first embodiment, a first power converter 21$a$ and a second power converter 22$a$ are provided as the plurality of power converters. The first and second power converters 21$a$ and 22$a$ serve as, for example, a switch. The power converting device 20A also includes a plurality of controllers, the number of which matches the number of power converters. That is, in the first embodiment, the power converting device 20A includes a first controller 21$b$ provided for controlling the first power converter 21$a$, and a second controller 22$b$ provided for controlling the second power converter 22$a$.

As the first and second power converters 21$a$ and 22$a$, an inverter is applied, but another converter, such as a DC-DC converter, can be applied.

For example, the first controller 21$b$ is designed as, for example, a computer circuit including a memory M1 serving as, for example, a storage according to the present disclosure. Similarly, the second controller 22$b$ is designed as, for example, a computer circuit including a memory M2 serving as, for example, a storage according to the present disclosure.

Specifically, the first power converter 21$a$ is operative to convert input power, i.e. DC power, supplied from the power source 10 into controlled power, i.e. controlled AC power, based on control signals sent from the first controller 21$b$, and supply the controlled power to the three-phase windings Lu, Lv, and Lw.

Similarly, the second power converter 21$b$ is operative to convert input power, i.e. DC power, supplied from the power source 10 into controlled power, i.e. controlled AC power, based on control signals sent from the second controller 22$b$, and supply the controlled power to the three-phase windings Lx, Ly, and La.

Each of the first power converters 21$a$ and 22$a$ is provided with a first pair of series-connected upper- and lower-arm (high- and low-side) switching elements S1$p$ and S1$n$, a second pair of series-connected upper- and lower-arm switching elements S2$p$ and S2$n$, and a third pair of series-connected upper- and lower-arm switching elements S3$p$ and S3$n$. Each of the first and second power converters 21$a$ and 22$a$ is also provided with flywheel diodes D1$p$, D1$n$, D2$p$, D2$n$, D3$p$, and D3$n$ electrically connected in antiparallel to the respective switching elements S1$p$, S1$n$, S2$p$, S2$n$, S3$p$, and S3$n$.

In the first embodiment, as the switching elements S*# (*=1, 2, and 3, and #=p and n), IGBTs are respectively used. When power MOSFETs are used as the switching elements S*#, intrinsic diodes of the power MOSFETs can be used as the flywheel diodes, thus eliminating the need for external flywheel diodes.

The first to third pairs of switching elements S1$p$, S1$n$, S2$p$, S2$n$, S3$p$, and S3$n$ of each of the first and second power converters 21$a$ and 22$a$ are parallelly connected to each other in bridge configuration.

A connecting point, through which the switching elements S1$p$ and S1$n$ of the first pair are connected to each other in series, is connected to an output lead extending from the separate terminal of the U-phase winding Lu. Similarly, a connecting point, through which the switching elements S2$p$ and S2$n$ of the second pair are connected to each other in series, is connected to an output lead extending from the separate end of the V-phase winding Lv. Moreover, a connecting point, through which the switching elements S3$p$ and S3$n$ of the third pair are connected to each other in series, is connected to an output lead extending from the separate end of the W-phase winding Lw.

One end of the series-connected switching elements of each of the first, second, and third pairs is connected to a positive terminal of the power source 10 via a positive input terminal of the first power converter 21$a$. The other end of the series-connected switching elements of each of the first, second, and third pairs is connected to a negative terminal of the power source 10 via a negative input terminal of the first power converter 21$a$.

The connections between the second power converter 22$a$ and the second set 30$b$2 of the three-phase windings Lx, Ly, and Lz are identical to those between the first power converter 21$a$ and the first set 30$b$1 of the three-phase windings Lu, Lv, and Lw. Thus, the descriptions of the connections between the second power converter 22$a$ and the second set 30$b$2 of the three-phase windings Lx, Ly, and Lz are omitted. The connections between the second power converter 22$a$ and the power source 10 are identical to those between the second power converter 22$a$ and the power source 10. Thus, the descriptions of the connections between the second power converter 22$a$ and the power source 10 are omitted.

Each of the switching elements S1$p$, S1$n$, S2$p$, S2$n$, S3$p$, and S3$n$ of each of the first and second power converters 21$a$ and 22$a$ has a control terminal CT connected to a corresponding one of the first and second controllers 21$b$ and 22$b$.

The power converting device 20A includes a capacitor C0, a first set of capacitors C1, and a second set of capacitors C2. The capacitor C0 is connected to the positive and negative terminals of the power source 10 in parallel to the power source 10. The capacitors C1 of the first set are connected to the positive and negative input terminals of the first power converter 21$a$ in parallel to the first power converter 21$a$. The capacitors C2 of the second set are connected to the positive and negative input terminals of the second power converter 22$a$ in parallel to the second power converter 22$a$.

The capacitors C0 and C1 are operative to smooth the voltage Vb supplied from the power source 10 to the first power converter 21$a$. The capacitors C0 and C2 are operative to smooth the voltage Vb supplied from the power source 10 to the second power converter 22a.

The first controller 21b is operative to output, to the first power converter 21a, i.e. the control terminals of the switching elements S1p, S1n, S2p, S2n, S3p, and S3n, on/off control signals according to:

variations of physical characteristics of the power converting system 100A depending on operations of the rotary electric machine 30; and control information to control the switching elements S1p, S1n, S2p, S2n, S3p, and S3n of the first power converter 21a.

Similarly, the second controller 22b is operative to output, to the second power converter 22a, i.e. the control terminals of the switching elements S1p, S1n, S2p, S2n, S3p, and S3n, on/off control signals according to:

the variations of the physical characteristics of the power converting system 100A depending on the operations of the rotary electric machine 30; and control information to control the switching elements S1p, S1n, S2p, S2n, S3p, and S3n of the second power converter 22a.

The control information used by the first controller 21b and the control information used by the second controller 22b can be identical to each other or different from each other.

The first controller 21b and the second controller 22b can be communicable with each other using wired or wireless connections therebetween. This modification permits:

the first controller 21b to know, from the second controller 22b, an electrical rotational angle ω of the rotor 30a, and a conduction angle δ in electrical angle for each of the three-phase windings Lx, Ly, and Lz of the second set 30b2; and the second controller 22b to know, from the first controller 21b, the electrical rotational angle ω of the rotor 30a, and a conduction angle δ in electrical angle for each of the three-phase windings Lu, Lv, and Lw of the first set 30b1.

The conduction angle δ for each of three-phase windings represents an electrical angle of the rotary electric machine 30 during which a corresponding phase winding is energized, i.e. a corresponding phase winding is conducting.

The variations of the physical characteristics of the power converting system 100A depending on the operations of the rotary electric machine 30 include, for example, variations of characteristic parameters PA indicative of the physical characteristics of the power converting system 100A depending on the operations of the rotary electric machine 30. For example, the characteristic parameters PA include:

the voltage Vb supplied from the power source 10;

an input voltage Vin1 input to the first power converter 21a based on the voltage Vb;

an input current Ib based on the voltage Vb to the first and second power converters 21a and 22a;

an input voltage Vin2 input to the second power converter 22a based on the voltage Vb;

a first output current I1 output from the first power converter 21a to be supplied to the three-phase windings Lu, Lv, and Lw;

a second output current I2 output from the second power converter 22a to be supplied to the three-phase windings Lx, Ly, and Lz;

output torque T of the rotary electric machine 30;

an efficiency η of the converted power from each of the first and second converters 21a and 22a relative to input power to a corresponding one of the first and second converters 21a and 22a;

the rotational speed N, i.e. the RPM (Revolutions Per Minute) or RPS (Revolutions Per Second) of the rotor 30a of the rotary electric machine 30; and a temperature Te of each of the rotary electric machine 30 and the power converting device 20A.

As a first exemplary example, the power converting system 100A can include sensors SS for measuring values of the characteristic parameters PA, and for sending information indicative of the measured values of the characteristic parameters PA to each of the first and second controllers 21b and 22b. For example, the sensors SS include a voltage sensor for measuring the voltage Vb supplied from the power source 10, a voltage sensor for measuring the input voltage Vin1, a current sensor for measuring the input current Ib, and a voltage sensor for measuring the input voltage Vin2. The sensors SS also include, for example, a current sensor for measuring the first output current I1, a current sensor for measuring the second output current I2, a torque sensor for measuring the output torque T, a rotational-speed sensor for measuring the rotational speed N of the rotor 30a, and a temperature sensor for measuring the temperature Te.

As a second exemplary example, each of the first and second controllers 21b and 22b can include information F stored in a corresponding one of the memories M1 and M2. The information F represents predetermined programs and/or computing equations that permit the corresponding controller to calculate, i.e. estimate, values of the characteristic parameters PA indicative of the physical characteristics of the power converting system 100A depending on the operations of the rotary electric machine 30.

Values of some of the parameters PA can be measured by some of the sensors SS, and values of the remaining parameters PA can be calculated based on the information F and the measured values of some of the parameters PA.

The control information determined to control the switching elements S1p, S1n, S2p, S2n, S3p, and S3n of each of the first and second power converters 21a and 22a can be designed as internal data, such as tables, maps, and the like, previously stored in the memory of the corresponding controller. The control information determined to control the switching elements S1p, S1n, 52p, S2n, S3p, and S3n of each of the first and second power converters 21a and 22a can be also designed as information externally sent from at least one of external devices ED to be loaded in the memory of the corresponding controller. The external devices ED are ECUs, computers, or the like, which are located externally to the power converter 20A.

Figure 2:
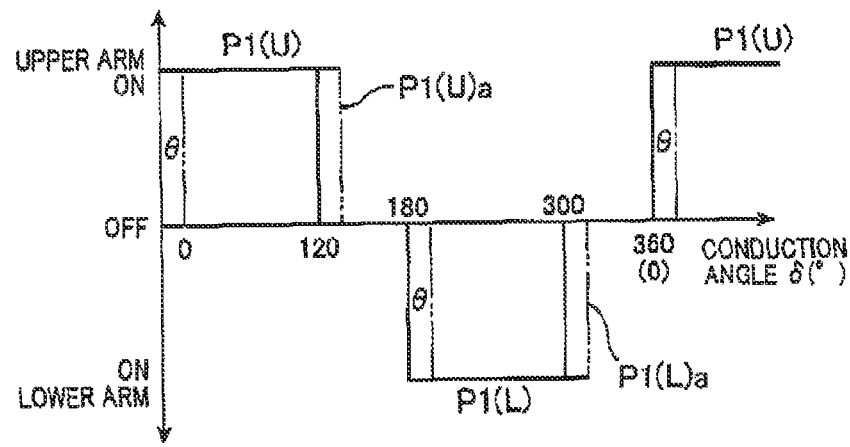
FIG. 2 is a graph schematically illustrating an energization pattern of a U-phase winding based on a 120-degree energization mode according to the first embodiment.
Figure 3:
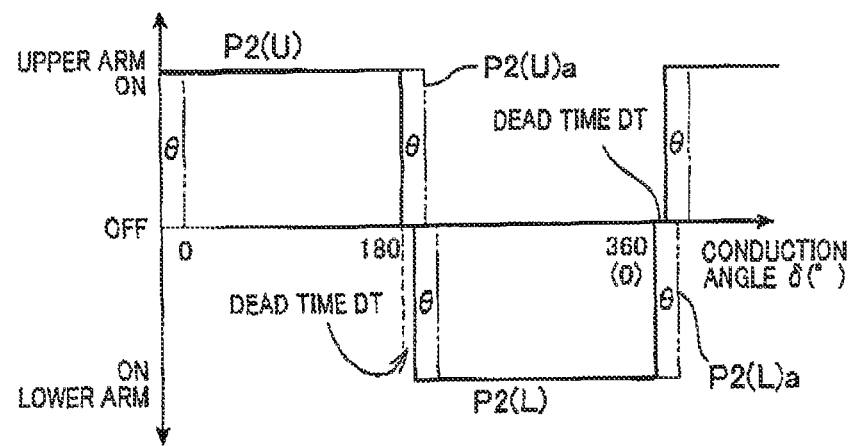
FIG. 3 is a graph schematically illustrating an energization pattern of the U-phase winding based on a 180-degree energization mode according to the first embodiment.
Figure 4:
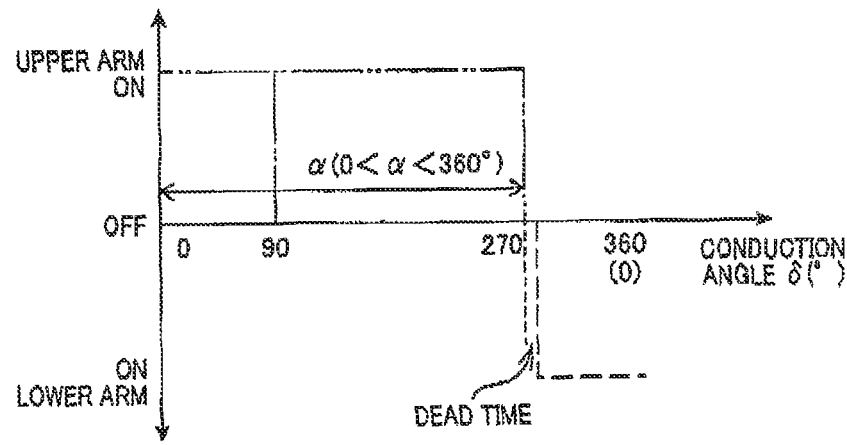
FIG. 4 is a graph schematically illustrating an energization pattern of the U-phase winding based on an α-degree energization mode according to the first embodiment.

FIGS. 2 to 4 schematically illustrate examples of how the first power converter 21a applies power, i.e. signal voltages, to the three-phase windings Lu, Lv, and Lw. The examples illustrated in FIGS. 2 to 4 can be similarly applied to how the second power converter 22a applies power, i.e. voltages to the three-phase windings Lx, Ly, and Lz.

Specifically, FIG. 2 schematically illustrates an energization pattern of one reference phase winding in the three-phase windings Lu, Lv, and Lw based on a 120-degree energization mode that uses 120 electrical degrees as the conduction angle δ. In the first embodiment, the reference phase winding is the U-phase winding Lu, and an electrical phase correlation of the rotor 30a relative to the reference phase winding, i.e. the U-phase winding Lu, is defined as phase information of the rotor 30a. In the first embodiment, an electrical angle of the direction of magnetic flux generated by an N pole of the rotor 30a relative to the reference phase winding, i.e. the U-phase winding Lu, is defined as a phase angle θ of the rotor 30a as an example of the phase information of the rotor 30a.

Specifically, FIG. 2 illustrates, by solid lines, an on-off pattern P1(U) of the upper-arm switching element S1p for the U-phase winding Lu in the 120-degree energization mode when the phase angle θ of the rotor 30a is set to zero degrees. The on-off pattern P1(U) shows that the upper-arm switching element S1p is switched on so that the U-phase winding Lu is positively energized by a pulse voltage, i.e. a drive pulse signal, during rotation of the rotor 30a from 0 electrical degrees to 120 electrical degrees, and during rotation of the rotor 30a from 360 electrical degrees, i.e. 0 degrees, to 120 electrical, degrees. That is, the pulse width, i.e. pulse duration, of the pulse voltage with a given amplitude corresponds to energization duration, i.e. 120 electrical degrees, of the U-phase winding Lu.

FIG. 2 also illustrates an on-off pattern P1(L) of the lower-arm switching element S1n for the U-phase winding Lu in the 120-degree energization mode. The on-off pattern P1(L) shows that the lower-arm switching element S1n is switched on so that the U-phase winding Lu is negatively energized by a pulse voltage during rotation of the rotor 30a by 120 electrical degrees each time the rotor 30a has turned by 60 electrical degrees since turn-off of the upper-arm switching element S1p.

In addition, FIG. 2 illustrates, by two-dot chain lines, that an on-off pattern P1(U)a of the upper-arm switching element S1p for the U-phase winding Lu in the 120-degree energization mode when the phase angle θ of the rotor 30a is not set to zero degrees. The on-off pattern P1(U)a shows that the U-phase winding is positively energized by a pulse voltage during rotation of the rotor 30a from θ electrical degrees to (120+θ) electrical degrees, and during rotation of the rotor 30a from (360+θ) electrical degrees to (120+θ) degrees.

Similarly, an on-off pattern P1(L)a illustrated in FIG. 2 shows that the U-phase winding is negatively energized by a pulse voltage during rotation of the rotor 30a from (180+θ) electrical degrees to (300+θ) electrical degrees.

An on-off pattern of the upper-arm switching element S2p for the V-phase winding Lv in the 120-degree energization mode has a phase difference of 120 electrical degrees with respect to the on-off pattern of the upper-arm switching element S1p. An on-off pattern of the lower-arm switching element S2n for the V-phase winding Lv in the 120-degree energization mode has a phase difference of 120 electrical degrees with respect to the on-off pattern of the lower-arm switching element S1n.

Similarly, an on-off pattern of the upper-arm switching element S3p for the W-phase winding Lw in the 120-degree energization mode has a phase difference of 120 electrical degrees with respect to the on-off pattern of the upper-arm switching element S2p. An on-off pattern of the lower-arm switching element S3n for the W-phase winding Lw in the 120-degree energization mode has a phase difference of 120 electrical degrees with respect to the on-off pattern of the lower-arm switching element S2n.

FIG. 3 schematically illustrates an energization pattern of the U-phase winding Lu based on a 180-degree energization mode that uses 180 electrical degrees as the conduction angle δ.

Specifically, FIG. 3 illustrates, by solid lines, an on-off pattern P2(U) of the upper-arm switching element S1p for the U-phase winding Lu in the 180-degree energization mode when the phase angle θ of the rotor 30a is set to zero degrees. The on-off pattern P2(U) shows that the upper-arm switching element S1p is switched on (turned on) so that the U-phase winding Lu is positively energized by a pulse voltage, i.e. a drive pulse, during rotation of the rotor 30a from 0 electrical degrees to 180 electrical degrees, and during rotation of the rotor 30a from 360 electrical degrees, i.e. 0 degrees, to 180 electrical degrees.

That is, the pulse width, i.e. pulse duration, of the pulse voltage with a given amplitude corresponds to energization duration, i.e. 180 electrical degrees, of the U-phase winding Lu.

FIG. 3 also illustrates an on-off, pattern P2(L) of the lower-arm switching element S1n for the U-phase winding Lu in the 180-degree energization mode. The on-off pattern P2(L) shows that the lower-arm switching element S1n is switched on so that the U-phase winding Lu is negatively energized by a pulse voltage during rotation of the rotor 30a by 180 electrical degrees after a dead time DT has elapsed since each time the upper-arm switching element S1p is switched off. That is, there is a need of the dead time DT between turn-on of the upper-arm switching element S1p and subsequent turn-on of the lower-arm switching element S1n in order to prevent short-circuit between the upper- and lower-arm switching elements S1p and S1n.

In addition, FIG. 3 illustrates, by two-dot chain lines, an on-off pattern P2(U)a of the upper-arm switching element S1p for the U-phase winding Lu in the 180-degree energization mode when the phase angle θ of the rotor 30a are not set to zero degrees. The on-off pattern P2(U)a shows that the U-phase winding is positively energized by a pulse voltage during rotation of the rotor 30a from θ electrical degrees to (180+θ) electrical degrees, and during rotation of the rotor 30a from (360+θ) electrical degrees to (180+θ) degrees.

Similarly, an on-off pattern P2(L)a illustrated in FIG. 3 shows that the U-phase winding is negatively energized by a pulse voltage during a rotation of the rotor 30a after the dead time DT has elapsed since each time the upper-arm switching element S1p is turned off.

An on-off pattern of the upper-arm switching element S2p for the V-phase winding Lv in the 180-degree energization mode has a phase difference of 120 electrical degrees with respect to the on-off pattern of the upper-arm switching element S1p. An on-off pattern of the lower-arm switching element S2n for the V-phase winding Lv in the 180-degree energization mode has a phase difference of 120 electrical degrees with respect to the on-off pattern of the lower-arm switching element S1n.

Similarly, an on-off pattern of the upper-arm switching element S3p for the W-phase winding Lw in the 180-degree energization mode has a phase difference of 120 electrical degrees with respect to the on-off pattern of the upper-arm switching element S2p. An on-off pattern of the lower-arm switching element S3n for the W-phase winding Lw in the 180-degree energization mode has a phase difference of 120 electrical degrees with respect to the on-off pattern of the lower-arm switching element S2n.

FIG. 4 schematically illustrates an energization pattern of the U-phase winding Lu based on an α-degree energization mode that uses a electrical degrees as the conduction angle δ; α is set within the range higher than 0 electrical degrees and lower than 360 electrical degrees.

Specifically, FIG. 4 illustrates an on-off pattern P3(U) of the upper-arm switching element S1p for the U-phase winding Lu in the α-degree energization mode when the phase angle θ of the rotor 30a is set to zero degrees. The on-off pattern P3(U) shows that the upper-arm switching element S1p is turned on so that the U-phase winding Lu is positively energized by a pulse voltage during rotation of the rotor 30a from 0 electrical degrees to α electrical degrees.

For example, FIG. 4 illustrates, by two-dot chain lines, that an on-off pattern P3(U) of the upper-arm switching element S1p for the U-phase winding Lu in the α-degree energization mode when α is set to 90 electrical degrees or 270 electrical degrees.

An on-off pattern P3(L) of the lower-arm switching element S1n for the U-phase winding Lu in the α-degree energization mode shows that the lower-arm switching element S1n is turned on so that the U-phase winding Lu is negatively energized by a pulse voltage during a predetermined period after the dead time DT has elapsed since each time the upper-arm switching element S1p is turned off; the predetermined period corresponds to rotation of the rotor 30a by α electrical degrees.

An on-off pattern of the upper-arm switching element S2p for the V-phase winding Lv in the α-degree energization mode has a phase difference of 120 electrical degrees with respect to the on-off pattern of the upper-arm switching element S1p. An on-off pattern of the lower-arm switching element S2n for the V-phase winding Lv in the α-degree energization mode has a phase difference of 120 electrical degrees with respect to the on-off pattern of the lower-arm switching element S1n.

Similarly, an on-off pattern of the upper-arm switching element S3p for the W-phase winding Lw in the α-degree energization mode has a phase difference of 120 electrical degrees with respect to the on-off pattern of the upper-arm switching element S2p. An on-off pattern of the lower-arm switching element S3n for the W-phase winding Lw in the α-degree energization mode has a phase difference of 120 electrical degrees with respect to the on-off pattern of the lower-arm switching element S2n.

Note that non-energization mode for the three-phase windings is a pattern not to output power from the power converting device 20A, in other words, an on-off pattern of all the switching elements of the first or second power converter 21a or 22a having 0 electrical degrees as the conduction angle δ (see FIG. 11 described later). In other words, α being set to 0 electrical degrees represents the non-energization mode.

Table 1 shows an example of combination patterns of a first energization pattern Pa of the switching elements of the first power converter 21a for the three-phase windings Lu, Lv, and Lw and a second pattern Pb of the switching elements of the second power converter 22a for the three-phase windings Lx, Ly, and Lz. The first energization pattern Pa includes at least a first energization duration for the three-phase windings Lu, Lv, and Lw, and the second energization pattern Pb includes at least a second energization duration for the three-phase windings Lx, Ly, and Lz. The combination patterns illustrated in table 1 are part of all combination patterns obtained from maps described in later (see FIGS. 8 and 9). In table 1, the three-phase windings Lu, Lv, and Lw are illustrated as PHASE WINDINGS (UVW), and the three-phase windings Lx, Ly, and Lz are illustrated as PHASE WINDINGS (XYZ).

In table 1, reference characters P1 to P9 show respective examples of the combination patterns. In table 1, NON-ENERGIZATION shows the non-energization mode, 120 DEGREES shows the 120-degree energization mode, and 180 DEGREES shows the 180-degree energization mode.

The combination pattern P1 is a combination pattern of the non-energization mode for the three-phase windings Lu, Lv, and Lw and the non-energization mode for the three-phase windings Lx, Ly, Ly, and L. The combination pattern P2 is a combination pattern of the non-energization mode for the three-phase windings Lu, Lv, and Lw and an energization pattern for the three-phase windings Lx, Ly, and Lz based on the 120-degree conduction mode (see 120 DEGREES in table 1). The combination pattern P6 is a combination pattern of an energization pattern for the three-phase windings Lu, Lv, Lw based on the 120-degree conduction mode and an energization pattern for the three-phase windings Lx, Ly, and Lz based on the 180-degree conduction mode (see 180 DEGREES in table 1). The other energization patterns P3 to P5 and P7 to P9 are illustrated in table 1.

As illustrated in each of the combination patterns P1, P5, and P9, the first and second controllers 21b and 22b drive the switching elements S*# (*=1, 2, and 3, #=p and n) of the respective first and second power converters 21a and 22a based on the same energization patterns.

In the first embodiment, the first and second controllers 21b and 22b can be configured to drive the switching elements S*# of the respective first and second power converters 21a and 22a based on the same energization patterns preferably when one or more predetermined conditions associated with the power converting system 100A are satisfied. For example, the predetermined conditions can include:

a condition that values of predetermined parameters indicative of the power-supply capability of the power source 10, such as the capacity, the rated voltage, and the rated current of the power source 10, are higher than predetermined threshold values; and a condition that no other devices are connected in parallel to the power source 10.

For example, if the power converting system 100A is installed in a motor vehicle, the other devices include, for example, devices required for safety drive of the motor vehicle, such as an EPS (Electric Power Steering), a braking system, an engine ECU, and the like.

The predetermined conditions can also include the following condition. Specifically, the condition is that a voltage induced in the rotary electric machine 30 is higher than a reference voltage, such as half of the voltage Vb supplied from the power source 10, and a predetermined allowable current level for each of the power converting device 20A and the rotary electric machine 30 is larger than the level of a current flowing in a corresponding one of the power converting device 20A and the rotary electric machine 30.

TABLE 1

| CONDUCTION ANGLE δ | | PHASE WINDINGS (XYZ) Pb | | |
|---|---|---|---|---|
| | Pa | NON-ENERGIZATION | 120 DEGREES | 180 DEGREES |
| PHASE WINDINGS (UVW) | NON-ENERGIZATION | P1 | P2 | P3 |
| | 120 DEGREES | P4 | P5 | P6 |
| | 180 DEGREES | P7 | P8 | P9 |

Note that the voltage induced in the rotary electric machine 30, the voltage Vb supplied from the power source 10, and the level of a current flowing in each of the power converting device 20A and the rotary electric machine 30 can be measured by the sensors SS.

Each of the first and second controllers 21b and 22b can be configured to use a value for the conduction angle δ; the value for the conduction angle δ is different from 0 electrical degrees in the non-energization mode, 120 electrical degrees in the 120-degree energization mode, and 180 electrical degrees in the 180-degree energization mode.

Each of the first and second controllers 21b and 22b can be configured to change the conduction angle δ based on the variations of the physical characteristics of the power converting system 100A depending on the operations of the rotary electric machine 30. For example, each of the first and second controllers 21b and 22b can be configured to gradually increase or decrease the conduction angle δ based on the variations of the physical characteristics of the power converting system 100A depending on the operations of the rotary electric machine 30. Specifically, the combination patterns listed in table 1 can be previously determined for each of the changed values of the conduction angle δ.

Table 2 shows an example of combination patterns between:

the first energization pattern Pa for the three-phase windings Lu, Lv, and Lw when the phase angle θ of the rotor 30a relative to the U-phase winding Lu is referred to as θ1; and the second pattern Pb for the three-phase windings Lx, Ly, and Lz when the phase angle θ of the rotor 30a relative to the X-phase winding Lx as a reference winding is referred to as θ2. The combination patterns illustrated in table 2 are part of all combination patterns stored in the maps described in later (see FIGS. 8 and 9).

and Lw and the energized windings Lx, Ly, and Lz have the phase difference φ therebetween.

As described above, the three-phase windings Lu, Lv, and Lw are connected to each other in star(Y)-configuration, and the second set 30b2 of the three-phase windings Lx, Ly, and Lz are connected to each other in star(Y)-configuration as illustrated in FIG. 1, but the present disclosure is not limited thereto.

Figure 6:
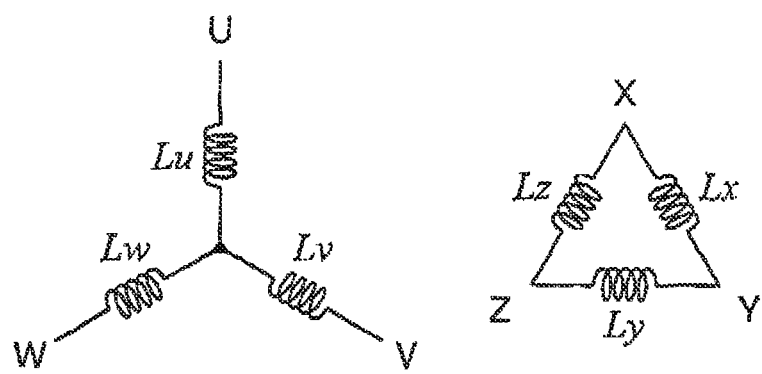
FIG. 6 is a view schematically illustrating the first set of the three-phase windings having star-configuration and the second set of the three-phase windings having delta-configuration.
Figure 7:
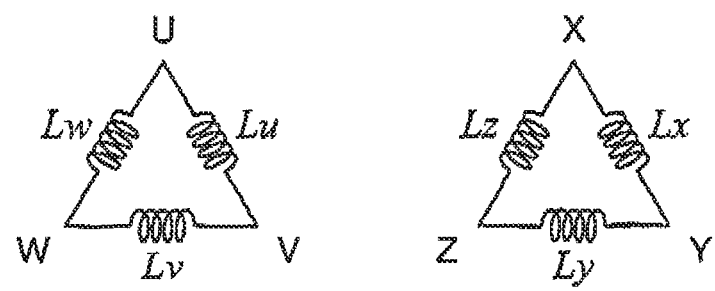
FIG. 7 is a view schematically illustrating the first set of the three-phase windings having delta-configuration and the second set of the three-phase windings having delta-configuration.

For example, as illustrated in FIG. 6, the three-phase windings Lu, Lv, and Lw can be connected to each other in star(Y)-configuration, and the second set 30b2 of the three-phase windings Lx, Ly, and Lz can be similarly connected to each other in delta(Δ)-configuration. As another example, as illustrated in FIG. 7, the three-phase windings Lu, Lv, and Lw can be connected to each other in delta(Δ)-configuration, and the second set 30b2 of the three-phase windings Lx, Ly, and Lz can be similarly connected to each other in delta(Δ)-configuration.

For example, information indicative of the tables 1 and 2 can be previously stored in at least one of the memory M1 or memory M2, or can be loaded from at least one of the external devices ED to be stored in at least one of the memory M1 or the memory M2. The information indicative of the tables 1 and 2 can be obtained by each of the first and second controllers 21b and 22b in real time based on the values of the characteristic parameters PA to be stored in a corresponding one of the memories M1 and M2. In FIG. 1, the information indicative of the tables 1 and 2 is illustrated by reference character TA.

Next, how the first and second controllers 21b and 22b specifically control, i.e. drive, the switching elements S*# of the first and second power converters 21a and 22a will be described in detail hereinafter with reference to FIGS. 8 to 13.

TABLE 2

| PHASE WINDINGS (UVW) | PHASE WINDINGS (XYZ) Pa | PHASE ANGLE θ2 Pb | | |
|---|---|---|---|---|
| | | NON-ENERGIZATION | 120 DEGREES | 180 DEGREES |
| PHASE ANGLE θ1 | NON-ENERGIZATION | P11 | P12 | P13 |
| | 120 DEGREES | P14 | P15 | P16 |
| | 180 DEGREES | P17 | P18 | P19 |

That is, the first energization pattern Pa includes at least the first energization duration and the phase angle θ1 for the three-phase windings Lu, Lv, and Lw, and the second energization pattern Pb includes at least the second energization duration and the phase angle θ2 for the three-phase windings Lx, Ly, and Lz.

In table 2, the combination patterns P11 to P19 are respectively identical to the combination patterns P1 to P9 listed in table 1. The phase angle θ1 can be identical to or different from the phase angle θ2, so that the number of combination patterns listed in table 2 is unlimited.

Figure 5:
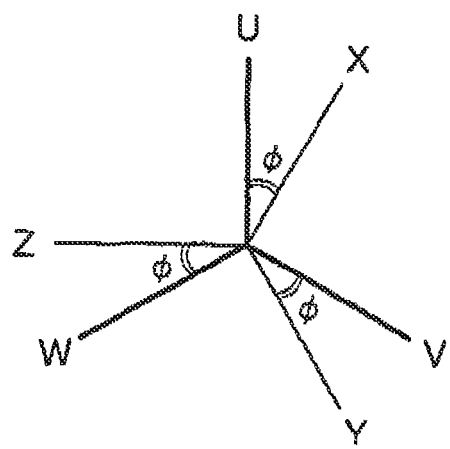
FIG. 5 is a view schematically illustrating a phase difference in electrical degrees between a first set of three-phase windings and a second set of three-phase windings.
Figure 8:
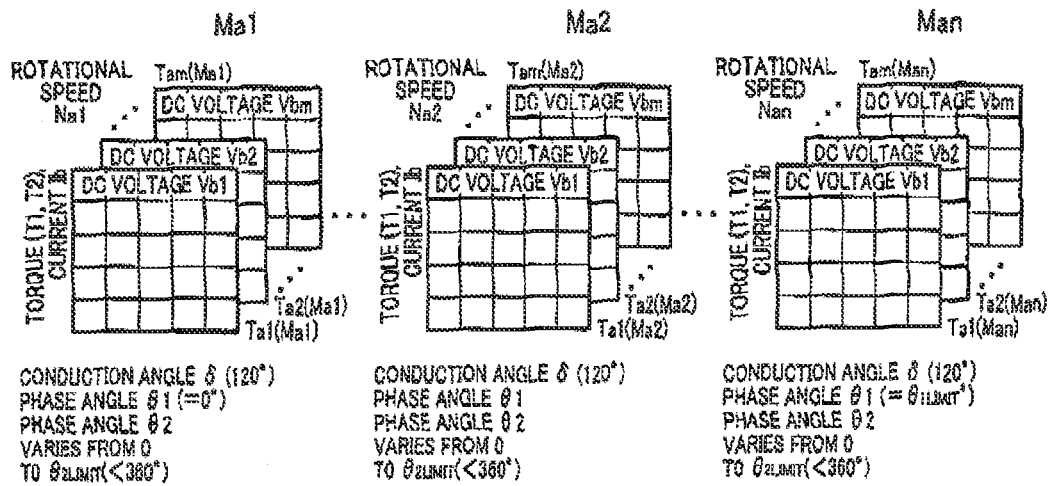
FIG. 8 is a view schematically illustrating maps predetermined for the 120-degree energization mode according to the first embodiment.
Figure 9:
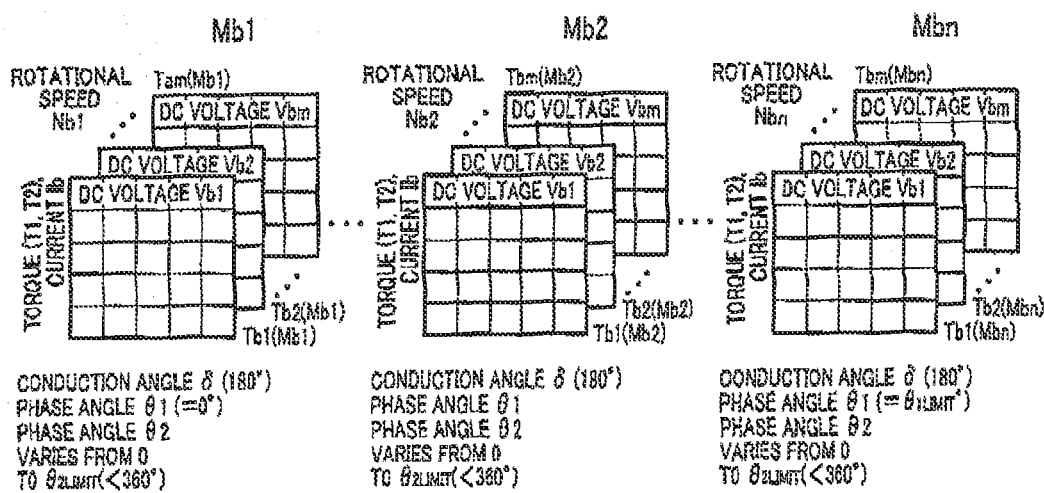
FIG. 9 is a view schematically illustrating maps predetermined for the 180-degree energization mode according to the first embodiment.

In the first embodiment, the three-phase windings Lu, Lv, and Lw and the three-phase windings Lx, Ly, and Lz can be wound in and around a core such that the three-phase windings Lu, Lv, and Lw and the three-phase windings Lx, Ly, and Lz have a phase difference φ in electrical degrees relative to each other (see FIG. 5). The phase difference φ can be set to a value within the range equal to or higher than 0 electrical degrees and lower than 360 electrical degrees. The phase difference φ similarly functions as the phase angles θ1 and θ2 because the energized windings Lu, Lv, FIGS. 8 and 9 illustrate examples of the maps to which each of the first and second controllers 21b and 22b refers when controlling the corresponding switching elements S*# to supply power to the corresponding three-phase windings. The maps illustrated in FIGS. 8 and 9 can be previously stored in at least one of the memory M1 or memory M2, or can be loaded from at least one of the external devices ED to be stored in at least one of the memory M1 or the memory M2.

Specifically, FIG. 8 illustrates first to n-th maps Ma1 to Man predetermined for the 120-degree energization mode (n is an integer equal to or more than 1).

The first map Ma1 includes m tables Ta1(Ma1) to Tam (Ma1) correlating with a value Na1 of the rotational speed of the rotor 30a (m is an integer equal to or more 1). The m tables Ta1(Ma1) to Tam(Ma1) also correlate with respective m values Vb1 to Vbm, which are different from each other, of the voltage Vb supplied from the power source 10.

Each of the tables Ta1(Ma1) to Tam (Ma1) represents correlations between values off a variable of a first output torque T1, values of a variable of a second output torque T2, and corresponding values of a variable of the input current Ib.

Each value of the first output torque T1, a corresponding value of the second output torque T2, and a corresponding value of the input current Ib included in a table Tak(Ma1) (1≤k≤m) are obtained when:

a corresponding value Vbk of the voltage Vb is supplied from the power source 10 at the value Na1 of the rotational speed of the rotor 30*a*;

the conduction angle δ is set to 120 electrical degrees;

the phase angle θ1 is set to a corresponding value selected from values ranging from 0 electrical degrees to a first upper limit angle $\theta_{1LIMIT}$ lower than 360 electrical degrees; and the phase angle θ2 is set to a corresponding value selected from values ranging from 0 electrical degrees to a second upper limit angle $\theta_{2LIMIT}$ lower than 360 electrical degrees.

Note that the output torque T is comprised of the first output torque T1 and the second output torque T2. The first output torque T1 is torque generated by the three-phase windings Lu, Lv, and Lw in cooperation with the magnetic poles of the rotor 30*a*. The second output torque T2 is torque generated by the three-phase windings Lx, Ly, and Lz in cooperation with the magnetic poles of the rotor 30*a*. For example, each of the first output torque T1 and the second output torque T2 can include positive torque in a predetermined forward rotating direction of the rotor 30*a* and negative torque in the reverse direction of the forward rotating direction of the rotor 30*a*.

Similarly, the second map Ma2 includes m tables Ta1 (Na2) to Tam(Na2) correlating with a value Na2 of the rotational speed of the rotor 30*a*. The m tables Ta1(Na2) to Tam(Na2) also correlate with the respective m values Vb1 to Vbn of the voltage Vb supplied from the power source 10.

Each of the tables Ta1(Ma2) to Tam (Ma2) represents correlations between values of the variable of the first output torque T1, corresponding values of the variable of the second output torque T2, and corresponding values of the variable of the input current Ib.

Each value of the first output torque T1, a corresponding value of the second output torque T2, and a corresponding value of the input current Ib included in a table Tak(Ma2) are obtained when:

a corresponding value Vbk of the voltage Vb is supplied from the power source 10 at the value Na2 of the rotational speed of the rotor 30*a*;

the conduction angle δ is set to 120 electrical degrees;

the phase angle θ1 is set to a corresponding value selected from the values ranging from 0 electrical degrees to the first upper limit angle $\theta_{1LIMIT}$; and the phase angle θ2 is set to a corresponding value selected from the values ranging from 0 electrical degrees to the second upper limit angle $\theta_{2LIMIT}$.

The remaining maps Ma3 to Man are designed to be identical to the first map Ma1 or second map Ma2.

That is, the set of first to n-th maps Ma1 to Man includes the m×n tables Ta1(Ma1) to Tam(Ma1), Ta1(Ma2) to Tam (Ma2), . . . , Ta1(Man) to Tam(Man).

FIG. 9 illustrates first to n-th maps Mb1 to Mbn predetermined for the 180-degree energization mode.

The first map Mb1 includes m tables Tb1(Mb1) to Tbm (Mb1) correlating with the value Na1 of the rotational speed of the rotor 30*a*. The m tables Tb1(Mb1) to Tbm(Mb1) correlate with the respective m values Vb1 to Vbm of the voltage Vb supplied from the power source 10.

Each of the m tables Tb1(Mb1) to Tbm(Mb1) represents correlations between values of the variable of the first output torque T1, values of the variable of the second output torque T2, and corresponding values of the variable of the input current Ib.

Each value of the first output torque T1, a corresponding value of the second output torque T22, and a corresponding value of the input current Ib included in a table Tbk(Mb1) are obtained when:

a corresponding value Vbk of the voltage Vb is supplied from the power source 10 at the value Na1 of the rotational speed of the rotor 30*a*;

the conduction angle δ is set to 180 electrical degrees;

the phase angle θ1 is set to a corresponding value selected from the values ranging from 0 electrical degrees to the first upper limit angle $\theta_{1LIMIT}$; and the phase angle θ2 is set to a corresponding value selected from the values ranging from 0 electrical degrees to the second upper limit angle $\theta_{2LIMIT}$.

Similarly, the second map Mb2 includes in tables Tb1 (Mb2) to Tbm(Mb2) correlating with a value Nb2 of the rotational speed of the rotor 30*a*. The M tables Tb1(Mb2) to Tbm(Mb2) correlate with the respective m values Vb1 to Vbm of the voltage Vb supplied from the power source 10.

Each of the in tables Tb1(Mb2) to Tbm(Mb2) includes correlations between values of the variable of the first output torque T1, corresponding values of the variable of the second output torque T2, and corresponding values of the variable of the input current Ib.

Each value of the first output torque T1, a corresponding value of the second output torque T2, and a corresponding value of the input current Ib included in, a table Tbk(Mb2) are obtained when:

a corresponding value Vbk of the voltage Vb is supplied from the power source 10 at the value Na2 of the rotational speed of the rotor 30*a*;

the conduction angle δ is set to 120 electrical degrees;

the phase angle θ1 is set to a corresponding value selected from the values ranging from 0 electrical degrees to the first upper limit angle $\theta_{1LIMIT}$; and the phase angle θ2 is set to a corresponding value selected from the values ranging from 0 electrical degrees to the second upper limit angle $\theta_{2LIMIT}$.

The remaining maps Mb3 to Mbn are designed to be identical to the first map Mb1 or second map Mb2.

That is, the set of first to n-th maps Mb1 to Mbn includes the m×n tables Tb1(Mb1) to Tbm(Mb1), Tb1(Mb2) to Tbm(Mb2), . . . , Tb1(Mbn) to Tbm(Mbn).

At least one of the set of first to n-th maps Ma1 to Man or the set of first to n-th maps Mb1, to Mbn can include j×k tables (each of j and k is an integer equal to or more than 1); the number of j×k is different from the number of m×n.

The voltage range from the value Vb1 to Vbm inclusive represents an allowable variable range of the voltage Vb of the power source 10. The rotational-speed range from the value Na1 to the value Nan of the rotational speed of the rotor 30*a* represents an allowable variable range of the rotational speed of the rotor 30*a*.

The maps Ma1 to Man and Mb1 to Mbn are previously obtained based on, for example, experiments and/or simulations using the power converting system 100A and/or a computer-based model which functionally simulates the power converting system 100A. The maps Ma1 to Man and Mb1 to Mbn can be obtained by each of the first and second controllers 21*b* and 22*b* in real time based on the values of the characteristic parameters PA to be stored in a corresponding one of the memories M1 and M2.

Figure 10:
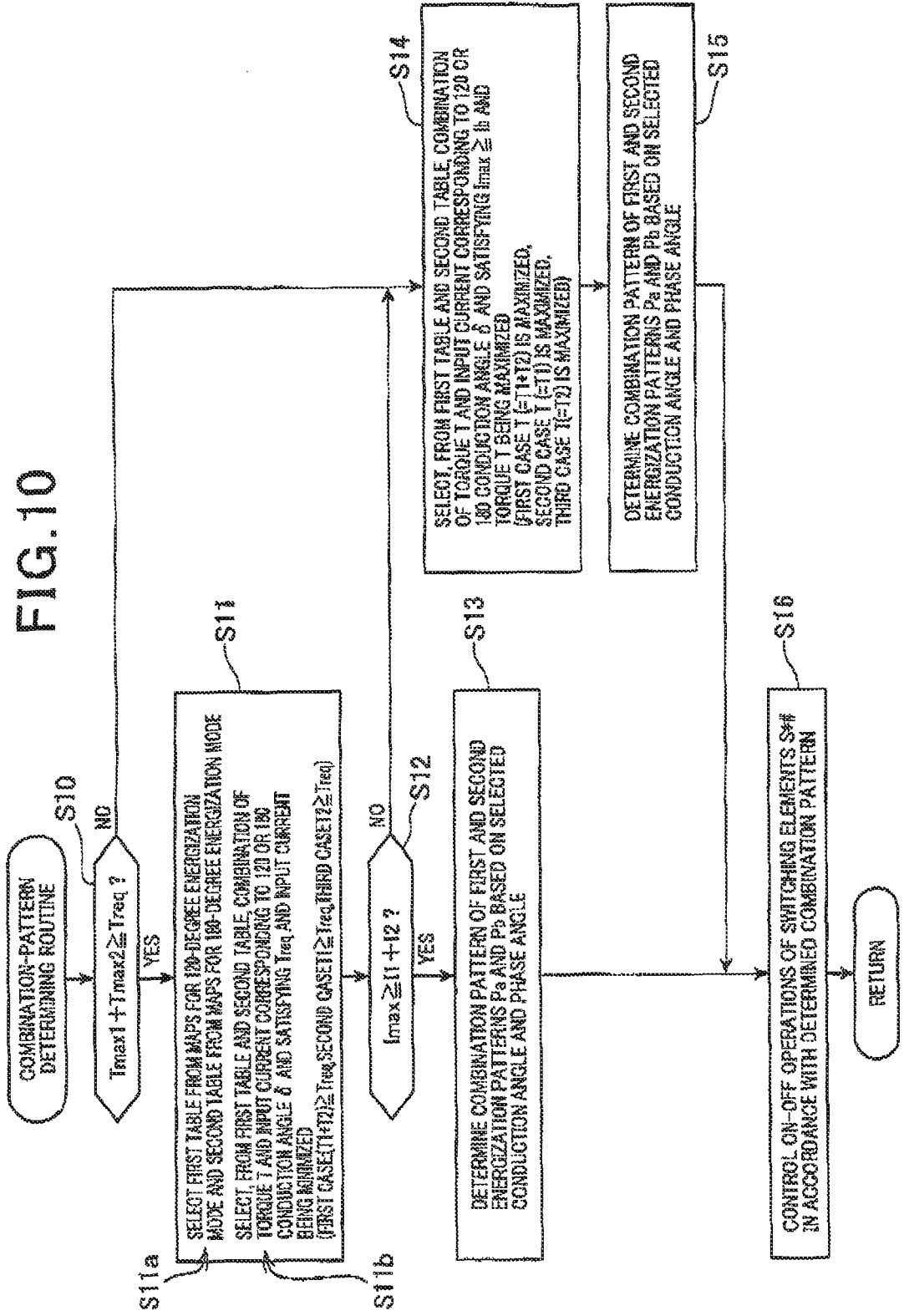
FIG. 10 is a flowchart schematically illustrating an example of combination-pattern determining routines carried out by each of first and second controllers illustrated in FIG. 1 according to the first embodiment.

FIG. 10 schematically illustrates an example of combination-pattern determining routines carried out by each of the first and second controllers 21*b* and 22*b*. For example, the combination-pattern determining routines are programs and preferably designed depending on the specifications of the rotary electric machine 30 and/or the configuration of a power supply system of a motor vehicle including the power source 10 if the power converting system 100A is installed in the motor vehicle. The configuration of the power supply system of the motor vehicle can include, for example, how the power source 10 is used, i.e. whether the power source 10 is dedicated for the power converting device 20A or used for one or more other devices in addition to the power converting device 20A. The configuration of the power supply system can also include how the ground system of the motor vehicle including the ground of the power converting system 100A is constructed.

A selected one of the combination-pattern determining routines is previously installed or externally loaded or externally loaded to be installed in each of the first and second controllers 21b and 22b.

Each of the first and second controllers 21b and 22b is configured to cyclically execute the combination-pattern determining routine installed therein. Note that the first and second controllers 21b and 22b can be configured to perform the combination-pattern determining routine individually or perform the combination-pattern determining routine in conjunction with each other while communicating with each other via the wire or wireless connections therebetween.

In FIG. 10, reference character Tmax1 represents maximum torque currently generable by the three-phase windings Lu, Lv, and Lw in cooperation with the magnetic poles of the rotor 30a, and reference character Tmax2 represents maximum torque currently generable by the three-phase windings Lx, Ly, and LZ in cooperation with the magnetic poles of the rotor 30a. That is, each of the maximum torque Tmax1 and the maximum torque Tmax2 can be calculated by a corresponding one of the first and second controllers 21b and 22b based on values of the parameters PA indicative of the physical characteristics of the power converting system 100A. In other words, each of the maximum torque Tmax1 and the maximum torque Tmax2 varies depending on values of the parameters PA indicative of the physical characteristics of the power converting system 100A.

Reference character Treq represents torque that the rotary electric machine 30 is requested to generate; the torque will be referred to as request torque. For example, the request torque Treq can be input from one of the external devices ED. If a load is coupled to the rotor 30a of the rotary electric machine 30, the request torque Treq is necessitated by the load.

Reference character Imax represents an allowable maximum value of the input current Ib supplied from the power source 10 to the power converting device 20A; the allowable maximum value Imax of the input current Ib will be referred to as an allowable maximum current Imax hereinafter.

When starting execution of the combination-pattern determining routine, each of the first and second controllers 21b and 22b performs the operation in step S10. Specifically, each of the first and second controllers 21b and 22b obtains, based on the variations of the physical characteristics of the power converting system 100A, the maximum torque Tmax1 of the three-phase windings Lu, Lv, and Lw, and the maximum torque Tmax2 of the three-phase windings Lx, Ly, and Lz in step S10.

In step S10, each of the first and second controllers 21b and 22b determines whether the sum of the maximum torque Tmax1 and the maximum torque Tmax2 is equal to or greater than the request torque Treq in step S10. In other words, each of the first and second controllers 21b and 22b determines whether the following equation is satisfied in step S10:

$$Tmax1 + Tmax2 \geq Treq$$

Upon determination that the sum of the maximum torque Tmax1 and the maximum torque Tmax2 is smaller than the request torque Treq, i.e. the equation is not satisfied (NO in step S10), execution of the combination-pattern determining routine proceeds to step S14 described later.

Otherwise, upon determination that the sum of the maximum torque Tmax1 and the maximum torque Tmax2 is equal to or greater than the request torque Treq, i.e. the equation is satisfied (YES in step S10), execution of the combination-pattern determining routine proceeds to step S11.

In step 11, each of the first and second controllers 21b and 22b individually selects, from all the maps Ma1 to Man (see FIG. 8) and Mb1 to Mbn (see FIG. 9), a first table for the 120-degree energization mode and a second table for the 180-degree energization mode. Each of the selected first and second tables matches with a present value of the voltage Vb of the power source 10 and a present value of the rotational speed of the rotor 30a (step S11a).

Then, in step S11, each of the first and second controllers 21b and 22b individually selects, from the selected first and second tables, the combination of a value of a corresponding one of the first output torque T1 and the second output torque T2 and a value of the input current Ib (see step S11b).

The selected combination of the value of the first output torque T1 by the first controller 21b, the value of the second output torque T2 by the second controller 22b, and the value of the input current Ib corresponds to one of:

120 electrical degrees for the conduction angle δ with a corresponding value of the phase angle θ1; and 180 electrical degrees for the conduction angle δ with a corresponding value of the phase angle θ2.

The combination of the value of the first output torque T1 selected by the first controller 21b, the value of the second output torque T2 selected by the second controller 22b, and the selected value of the input current Ib satisfies the following first and second conditions that:

the output torque T based on the sum of the selected value of the first output torque T1 and the selected value of the second output torque T2 is equal to or greater than the request torque Treq; and the selected value of the input current Ib, i.e. the sum of the first output current I1 and second output current I2, is minimized.

Note that the following three cases are considered to satisfy the first and second conditions:

the first case where the sum of the selected value of the first output torque T1 and the selected value of the second output torque T2 is equal to or greater than the request torque Treq while the corresponding selected value of the input current Ib is minimized;

the second case where the selected value of the first output torque T1 is equal to or greater than the request torque Treq while the corresponding selected value of the input current Ib is minimized; and the third case where the selected value of the second output torque T2 is equal to or greater than the request torque Treq while the corresponding selected value of the input current Ib is minimized.

Next, at least one of the first and second controllers 21b and 22b determines whether the allowable maximum input current Imax is equal to or greater than the value of the input current Ib, i.e. the sum of the first output current I1 and second output current I2, selected in step S11 in step S12.

Upon determination that the allowable maximum input current Imax is smaller than the sum of the first output current I1 and second output current I2 selected in step S11 (NO in step S12), execution of the combination-pattern determining routine proceeds to step S14 described later.

Otherwise, upon determination that the allowable maximum input current Imax is equal to or greater than the sum of the first output current I1 and second output current I2 selected in step 11 (YES in step S12), execution of the combination-pattern determining routine proceeds to step S13.

In step S13, for the first case selected in step S11, the first controller 21b determines, based on corresponding 120 or 180 electrical degrees as the conduction angle δ with a corresponding value of the phase angle θ1, an energization pattern as the first energization pattern Pa for the three-phase windings Lu, Lv, and Lw. In step S13, for the first case selected in step S11, the second controller 22b determines, based on corresponding 120 or 180 electrical degrees as the conduction angle δ with a corresponding value of the phase angle θ2, an energization pattern as the second energization pattern Pb for the three-phase windings Lx, Ly, and Lz.

In the first embodiment, for the first case selected in step S11, the determined combination pattern of the first energization pattern Pa and the second energization pattern Pb corresponds to one of the combination patterns P5, P6, P8, P9, P15, P16, P18, and P19 listed in the tables 1 and 2.

In step S13, for the second case selected in step S11, the first controller 21b determines, based on corresponding 120 or 180 electrical degrees as the conduction angle δ with a corresponding value of the phase angle θ1, an energization pattern as the first energization pattern Pa for the three-phase windings Lu, Lv, and Lw. In step S13, for the second case selected in step S11, the second controller 22b determines the non-energization mode as the second energization pattern Pb for the three-phase windings Lx, Ly, and Lz.

In the first embodiment, for the second case selected in step S11, the determined combination pattern of the first energization pattern Pa and the second energization pattern Pb corresponds to one of the combination patterns P4, P7, P14, and P17 listed in the tables 1 and 2.

In step S13, for the third case selected in step S11, the second controller 22b determines, based on corresponding 120 or 180 electrical degrees as the conduction angle δ with a corresponding value of the phase angle θ2, an energization pattern as the second energization pattern Pb for the three-phase windings Lx, Ly, and Lz. In step S13, for the third case selected in step S11, the first controller 21b determines the non-energization mode as the first energization pattern Pa for the three-phase windings Lu, Lv, and Lw.

In the first embodiment, for the third case selected in step S11, the determined combination pattern of the first energization pattern Pa and the second energization pattern Pb corresponds to one of the combination patterns P2, P3, P12, and P13 listed in the tables 1 and 2.

As described above, the combination pattern of the first energization pattern Pa and the second energization pattern Pb is determined in step S13.

On the other hand, if the negative determination is carried out in step S10 or step S12, (NO in step S10 or S12), each of the first and second controllers 21b and 22b performs the operation in step S14.

In step S14, each of the first and second controllers 21b and 22b individually selects, from the first and second tables selected in step S11, the combination of a value of a corresponding one of the first output torque T1 and the second output torque T2 and a value of the input current Ib.

The selected combination of the value of the first output torque T1 by the first controller 21b, the value of the second output torque T2 by the second controller 22b, and the value of the input current Ib corresponds to one of:

120 electrical degrees as the conduction angle δ with a corresponding value of the phase angle θ1; and 180 electrical degrees as the conduction angle δ with a corresponding value of the phase angle θ2.

The combination of the selected value of the first output torque T1 by the first controller 21b, the selected value of the second output torque T2 by the second controller 22b, and the selected value of the input current Ib satisfies the following third and fourth conditions that:

the allowable maximum input current Imax is equal to or greater than the selected value of the input current Ib, i.e. the sum of the first output current I1 and second output current I2; and the output torque T is maximized.

Note that the following three cases are considered to satisfy the third and fourth conditions:

the first case where the output torque T based on the sum of the selected value of the first output torque T1 and the selected value of the second output torque T2 is maximized while the allowable maximum input current Imax is equal to or greater than the corresponding selected value of the input current Ib;

the second case where the output torque T based on the selected value of the first output torque T1 is maximized while the allowable maximum input current Imax is equal to or greater than the corresponding selected value of the input current Ib; and the third case where the output torque T based on the selected value of the second output torque T2 is maximized while the allowable maximum input current Imax is equal to or greater than the corresponding selected value of the input current Ib.

Following the operation in step S14, execution of the combination-pattern determining routine proceeds to step S15.

In step S15, for the first case selected in step S14, the first controller 21b deter mines, based on corresponding 120 or 180 electrical degrees for the conduction angle δ with a corresponding value of the phase angle θ1, an energization pattern as the first energization pattern Pa for the three-phase windings Lu, Lv, and Lw. In step S15, for the first case selected in step S14, the second controller 22b determines, based on corresponding 120 or 180 electrical degrees for the conduction angle δ with a corresponding value of the phase angle θ2, an energization pattern as the second energization pattern Pb for the three-phase windings Lx, Ly, and Lz.

In the first embodiment, for the first case selected in step S14, the determined combination pattern of the first energization pattern Pa and the second energization pattern Pb corresponds to one of the combination patterns P5, P6, P8, P9, P15, P16, P18, and P19 listed in the tables 1 and 2.

In step S15, for the second case selected in step S14, the first controller 21b determines, based on corresponding 120 or 180 electrical degrees for the conduction angle δ with a corresponding value of the phase angle θ1, an energization pattern as the first energization pattern Pa for the three-phase windings Lu, Lv, and Lw. In step S15, for the second case selected in step S14, the second controller 22b determines the non-energization mode as the second energization pattern Pb for the three-phase windings Lx, Ly, and Lz.

In the first embodiment, for the second case selected in step S14, the determined combination pattern of the first energization pattern Pa and the second energization pattern Pb corresponds to one of the combination patterns P4, P7, P14, and P17 listed in the tables 1 and 2.

In step S15, for the third case selected in step S14, the second controller 22b determines, based on corresponding 120 or 180 electrical degrees for the conduction angle δ with a corresponding value of the phase angle θ2, an energization pattern as the second energization pattern Pb for the three-phase windings Lx, Ly, and Lz. In step S15, for the third case selected in step S14, the first controller 21b determines the non-energization mode as the first energization pattern Pa for the three-phase windings Lu, Lv, and Lw.

In the first embodiment, for the third case selected in step S14, the determined combination pattern of the first energization pattern Pa and the second energization pattern Pb corresponds to one of the combination patterns P2, P3, P12, and P13 listed in the tables 1 and 2.

As described above, the combination pattern of the first energization pattern Pa and the second energization pattern Pb is determined in step 15.

The determined combination pattern enables the power converters 21a and 22a to cause the rotary electric machine 30 to obtain a maximum value of the output torque T that can be generated by the three-phase windings (Lu, Lv, Lw) and (Lx, Ly, Lz) while maintaining the input current Ib being equal to or smaller than the allowable maximum current value Imax.

That is, the determined combination pattern enables the rotary electric machine 30 to obtain the maximum value of the output torque T while maintaining the input current Ib being equal to or smaller than the allowable maximum current value Imax even when starting the rotary electric machine 30, in other words, when driving the rotary electric machine 30, with the rotational speed of the rotor 30a being zero.

After the determination of the combination pattern of the first energization pattern Pa and the second energization pattern Pb in step S13 or S15, execution of the combination-pattern determining routine proceeds to step S16.

In step S16, each of the first and second controllers 21b and 22b controls on-off operations of the corresponding switching elements S*# in accordance with the determined combination pattern of the first energization pattern Pa and the second energization pattern Pb.

Thereafter, execution of the combination-pattern determining routine returns to step S10, and each of the first and second controllers 21b and 22b performs the aforementioned operations of the combination-pattern determining routine for the next cycle.

Next, examples of on-off switching patterns of the switching elements S*# for energizing the three-phase windings Lu, Lv, and Lw and the switching elements S*# for energizing the three-phase windings Lx, Ly, and Lz, which are controlled by the respective first and second controllers 21b and 22b will be described with reference to FIGS. 11 to 13.

The on-off switching patterns of the upper-arm switching elements S1p, S2p, and S3p and the lower-arm switching elements S1n, S2n, and S3n include on-off timings on-off durations of the upper-arm switching elements S1p, S2p, and S3p and the lower-arm switching elements S1n, S2n, and S3n.

Figure 11:
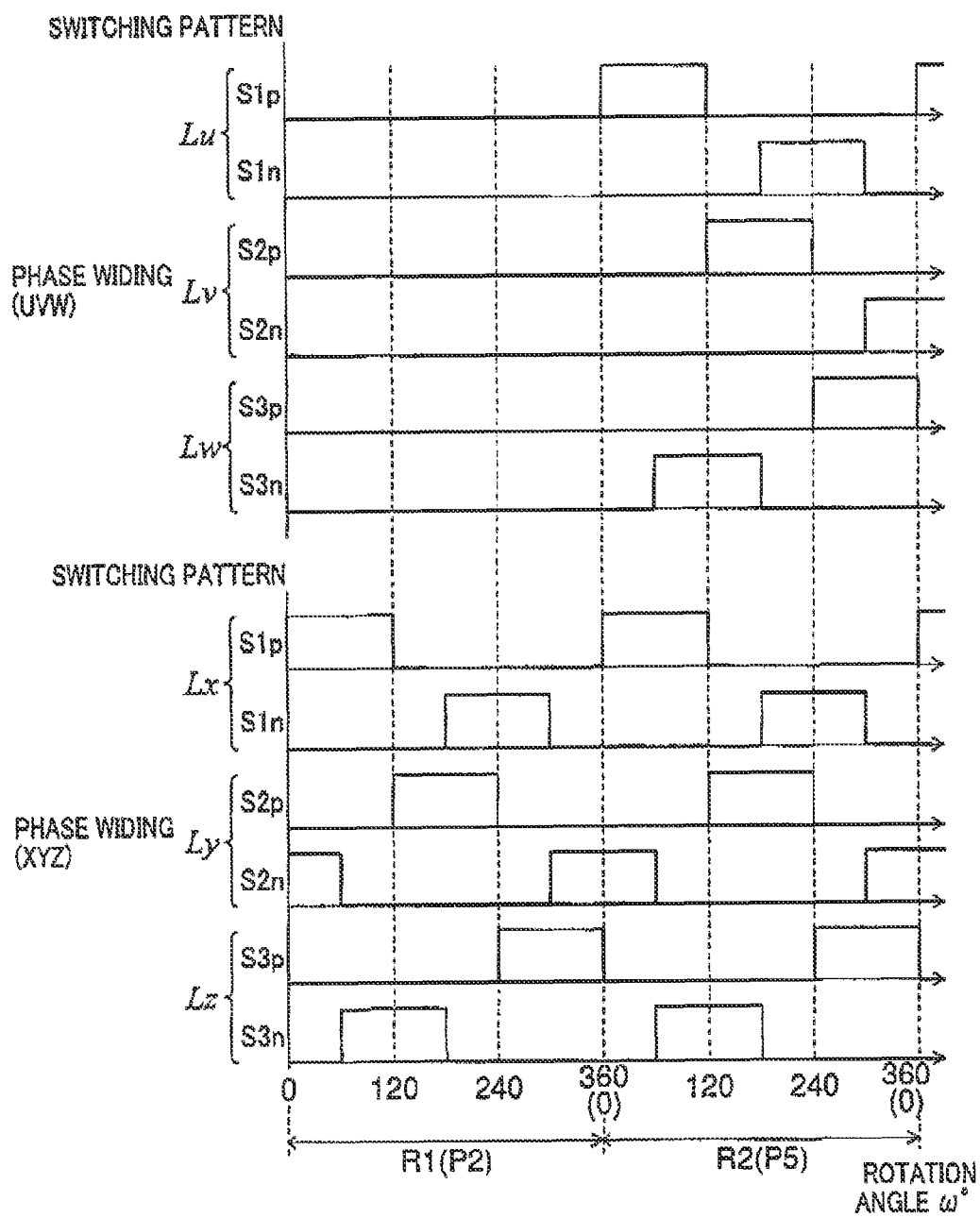
FIG. 11 is a timing chart schematically illustrating on-off switching patterns of switching elements of a first power converter and switching elements of a second power converter illustrated in FIG. 1 when a value of a phase angle for each set of the three-phase windings is set to zero and the phase difference is set to zero.
Figure 12:
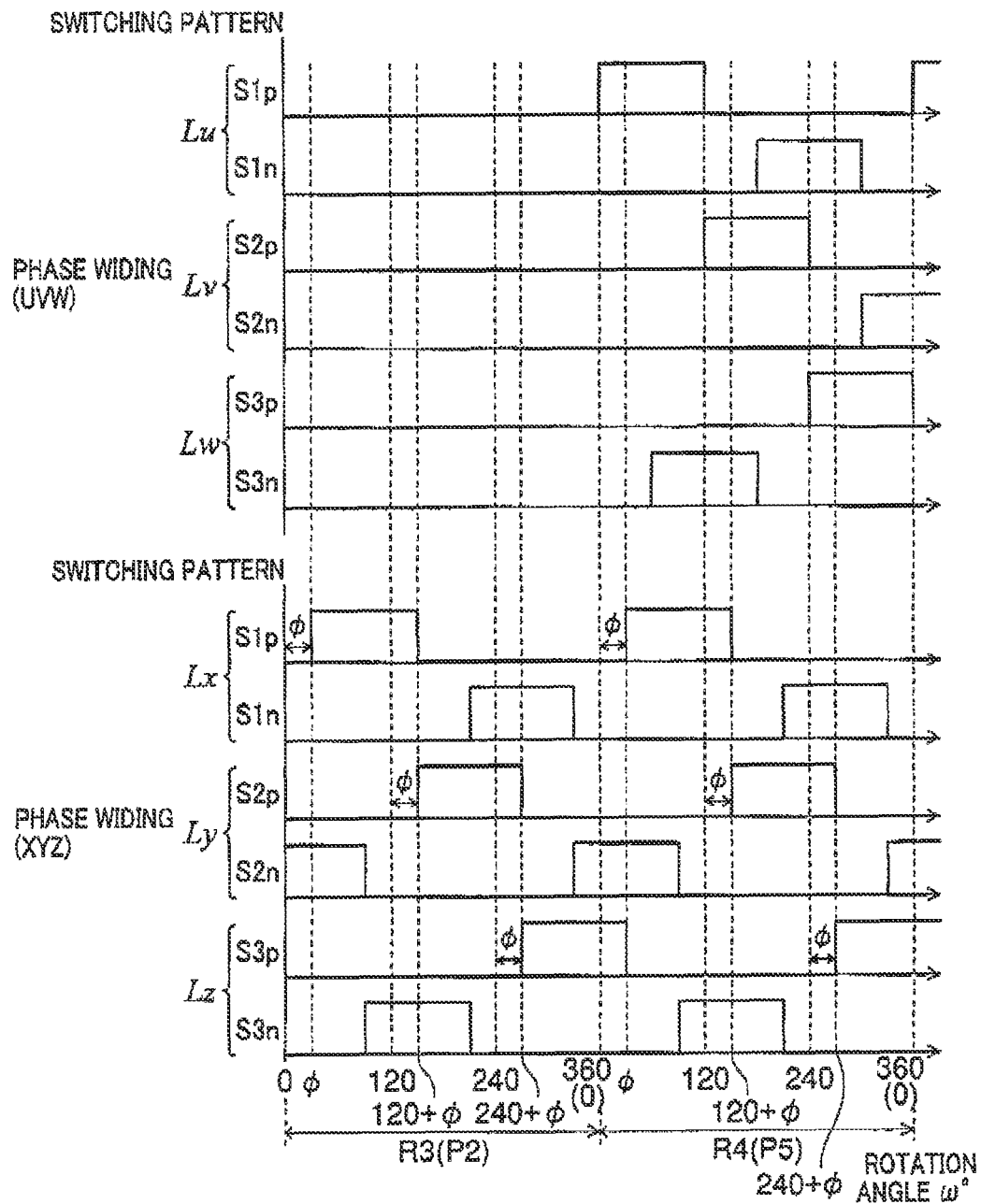
FIG. 12 is a timing chart schematically illustrating on-off switching patterns of the switching elements of the first power converter and the switching elements of the second power converter when a value of the phase angle for each set of the three-phase windings is set to zero and the phase difference is set to a given value.
Figure 13:
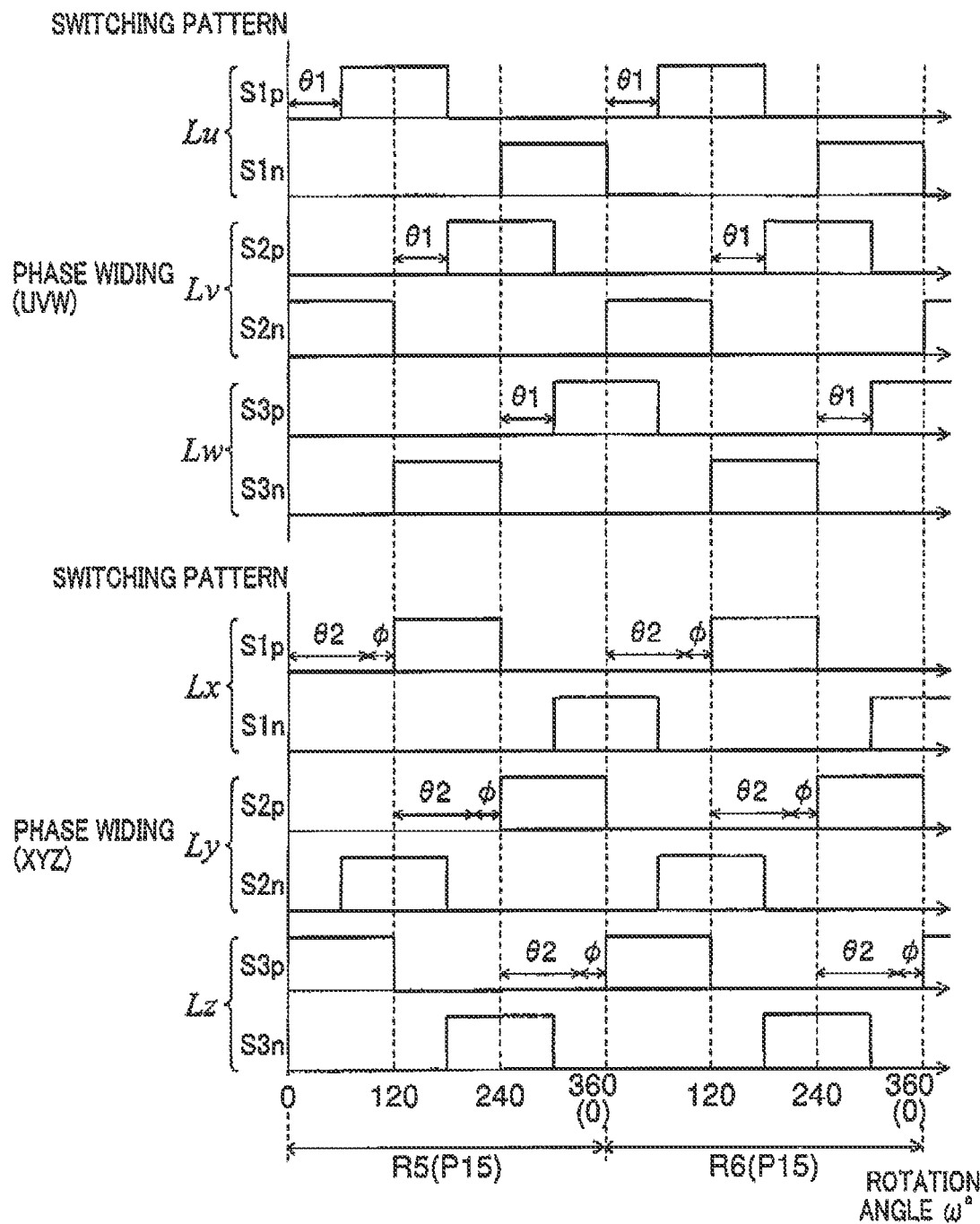
FIG. 13 is a timing chart schematically illustrating on-off switching patterns of the switching elements of the first power converter and the switching elements of the second power converter when a value of the phase angle for each set of the three-phase windings is set to a given value zero and the phase difference is set to a given value.

In FIGS. 11 to 13, reference characters R1 to R6 represent one cycle, i.e. 360 electrical degrees (2π radian), of the electrical rotational angle ω of the rotor 30a.

FIG. 11 illustrates on-off switching patterns of the switching elements S*# of the first power converter 21a and the switching elements S*# of the second power converter 22a when the value of each of the phase angles θ1 and θ2 is set to zero and the phase difference φ is set to zero.

In a first cycle R1 of rotation of the rotor 30a, the combination pattern of the first and second energization patterns Pa and Pb is set to the combination pattern P2 listed in table 1. That is, the first energization pattern Pa for the three-phase windings Lu, Lv, and Lw is set to the non-energization mode, and the second energization pattern Pb for the three-phase windings Lx, Ly, and Lz is set to the energization pattern based on the 120-degree conduction mode (see table 1). After lapse of the first cycle R1 of rotation of the rotor 30a, in the next cycle R2 of rotation of the rotor 30a, the combination pattern of the first and second energization patterns Pa and Pb is switched to the combination pattern P5 listed in table 1. That is, the first energization pattern Pa for the three-phase windings Lu, Lv, and Lw is set to the energization pattern based on the 120-degree conduction mode, and the second energization pattern Pb for the three-phase windings Lx, Ly, and Lz is set to the energization pattern based on the 120-degree conduction mode (see table 1).

Switching the combination pattern of the first and second energization patterns Pa and Pb to another combination pattern can be carried out every rotation of the rotor 30a by a given value of the electrical rotation angle ω. In other words, the switching timing from a current combination pattern of the first and second energization patterns Pa and Pb to another combination pattern can be determined based on the processing capability of each of the first and second controllers 21b and 22b, and a control cycle required to control the output torque T, the input/output current, and/or the input/output voltage. How to determine the switching timing described above can be applied to other on-off switching patterns of the switching elements S*# of the first power converter 21a and the switching elements S*# of the second power converter 22a illustrated in FIGS. 12 and 13.

FIG. 12 illustrates on-off switching patterns of the switching elements S*# of the first power converter 21a and the switching elements S*# of the second power converter 22a when the value of each of the phase angles θ1 and θ2 is set to zero and the phase difference φ is set to a given value.

In a first cycle R3 of rotation of the rotor 30a, the combination pattern of the first and second energization patterns Pa and Pb is set to the combination pattern P2 listed in table 1. That is, the first energization pattern Pa for the three-phase windings Lu, Lv, and Lw is set to the non-energization mode, and the second energization pattern Pb for the three-phase windings Lx, Ly, and Lz is set to the energization pattern based on the 120-degree conduction mode (see table 1). After lapse of the first cycle R3 of rotation of the rotor 30a, in the next cycle R4 of rotation of the rotor 30a, the combination pattern of the first and second energization patterns Pa and Pb is switched to the combination pattern P5 listed in table 1. That is, the first energization pattern Pa for the three-phase windings Lu, Lv, and Lw is set to the energization pattern based on the 120-degree conduction mode, and the second energization pattern Pb for the three-phase windings Lx, Ly, and Lz is set to the energization pattern based on the 120-degree conduction mode (see table 1).

FIG. 13 illustrates on-off switching patterns of the switching elements S*# of the first power converter 21a and the switching elements S*# of the second power converter 22a when the values of the phase angles θ1 and θ2 are respectively set to given values and the phase difference φ is set to a given value.

In a first cycle R5 of rotation of the rotor 30a, the combination pattern of the first and second energization patterns Pa and Pb is set to the combination pattern P15 listed in table 2. That is, the first energization pattern Pa for the three-phase windings Lu, Lv, and Lw is set to the energization pattern based on the 120-degree conduction mode, and the second energization pattern Pb for the three-phase windings Lx, Ly, and Lz is set to the energization pattern based on the 120-degree conduction mode (see table 2). After lapse of the first cycle R5 of rotation of the rotor 30a, in the next cycle R6 of rotation of the rotor 30a, the combination pattern of the first and second energization patterns Pa and Pb is maintained to the combination pattern P15.

As described above, a value of the phase angle θ1 and a value of the phase angle θ2 selected in step S11 or S14 can be equal to each other or different from each other. Each of the phase angle θ1 and the phase angle θ2 can be set to a value within the range from 0 electrical degrees to a corresponding one of the first and second upper limit angles $\theta_{1LIMIT}$ and $\theta_{2LIMIT}$ lower than 360 electrical degrees.

If zero is selected for each of the phase angles θ1 and θ2 in step S11 or S14, the switching patterns of the switching elements S*# of the first and second power converters 21a and 22a during rotation R5 of the rotor 30a illustrated in FIG. 13 are identical to those during rotation R4 illustrated in FIG. 12. Similarly, If zero is selected for each of the phase angles θ1 and θ2 in step S11 or S14, the switching patterns of the switching elements S*# of the first and second power converters 21a and 22a during rotation R6 of the rotor 30a illustrated in FIG. 13 are identical to those during rotation R4 illustrated in FIG. 12.

Figure 14:
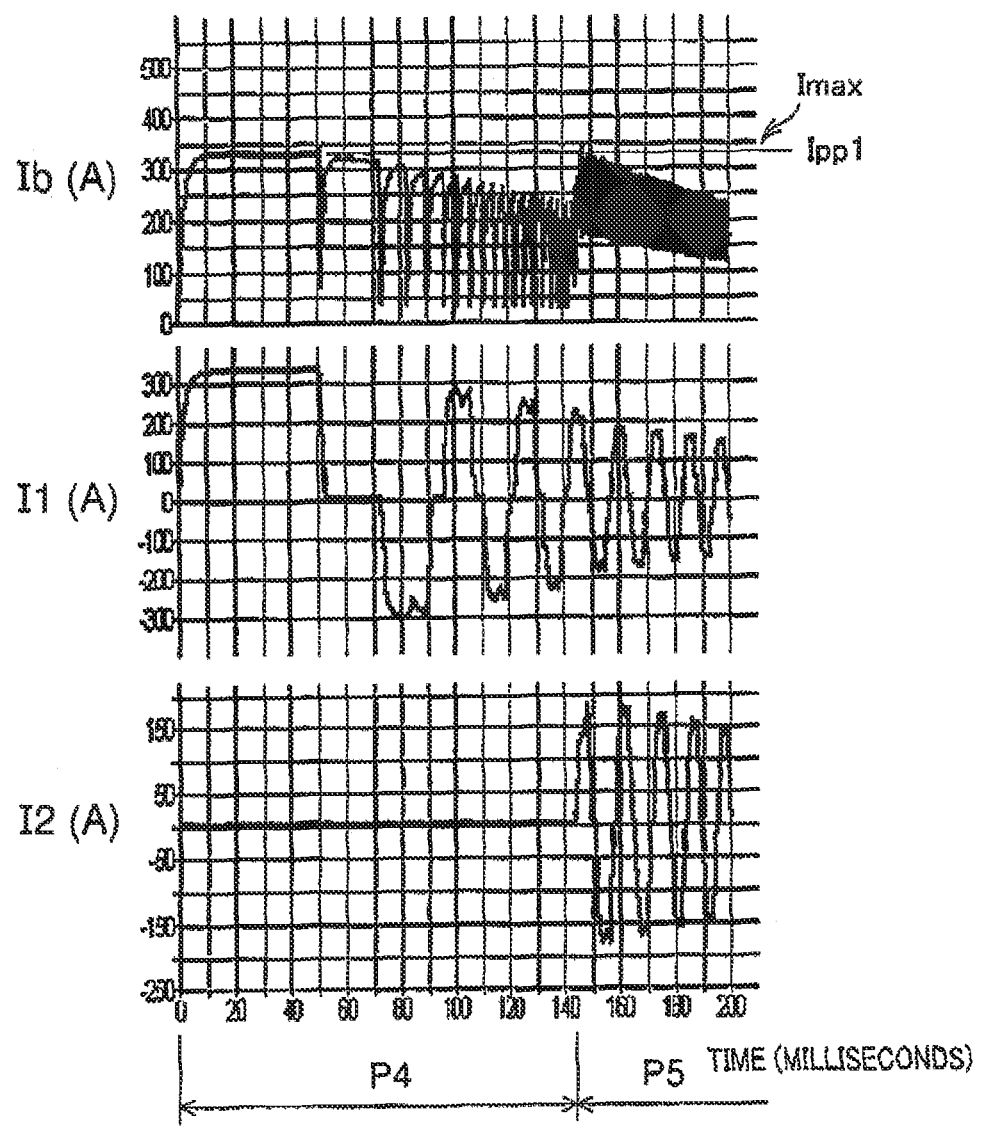
FIG. 14 is a graph schematically illustrating how an input current, a first output current, and a second output current flow when the three-phase windings of the first and second sets are energized while the combination pattern of the first and second energization patterns Pa and Pb is changed from one combination pattern to another combination pattern according to the first embodiment.

FIG. 14 schematically illustrates how the input current Ib, the first output current I1, and the second output current I2 flow when the three-phase windings Lu, Lv, Lw, Lx, Ly, and Lz are energized while the combination pattern of the first and second energization patterns Pa and Pb is changed from the combination pattern P4 to the combination pattern P5 according to the first embodiment.

FIG. 14 illustrates that the rotary electric machine 30 is energized based on the combination pattern P4 listed in table 1 from the start of energization of the rotary electric machine 30 (see zero [milliseconds] in FIG. 14). After the rotary electric machine 30 has been energized based on the combination pattern P4 for a preset period, the combination pattern P4 is switched to the combination pattern P5 listed in table 1, and thereafter the rotary electric machine 30 is energized based on the combination pattern P5. The start of energization corresponds to the start of rotation of the rotor 30a.

In FIG. 14, the preset period is set to 143 milliseconds or thereabout, but can be set to a given time length depending on the specifications of the rotary electric machine 30.

FIG. 14 shows how the input current Ib changes, how the first output current I1 is changed, and how the second output current I2 is changed from top to bottom in FIG. 14. Specifically, the input current Ib (A: amperes) is supplied from the power source 10 to be input to the power converting device 20A. The first output current I1 (A) is supplied from the first power converter 21a to flow through the three-phase windings Lu, Lv, and Lw. The second output current I2 (A) is supplied from the second power converter 22a to flow through the three-phase windings Lx, Ly, Lz, and Lz.

FIG. 14 demonstrates that energization of the three-phase winding Lu, Lv, and Lw with non-energization of the three-phase windings Lx, Ly, and Lz for the preset period after the start of energization of the rotary electric machine 30 results in a peak level Ipp1 of the input current Ib being controlled to be lower than the allowable maximum current Imax.

Specifically, the power converting device 20A according to the first embodiment is configured to:

cyclically determine the combination pattern of the first and second energization patterns Pa and Pb such that the peak level Ipp1 of the input current Ib does not exceed the allowable maximum current Imax; and control on-off operations of the switching elements S*# of the first and second power converters 21a and 22a in accordance with the determined combination pattern for each cycle.

Figure 15:
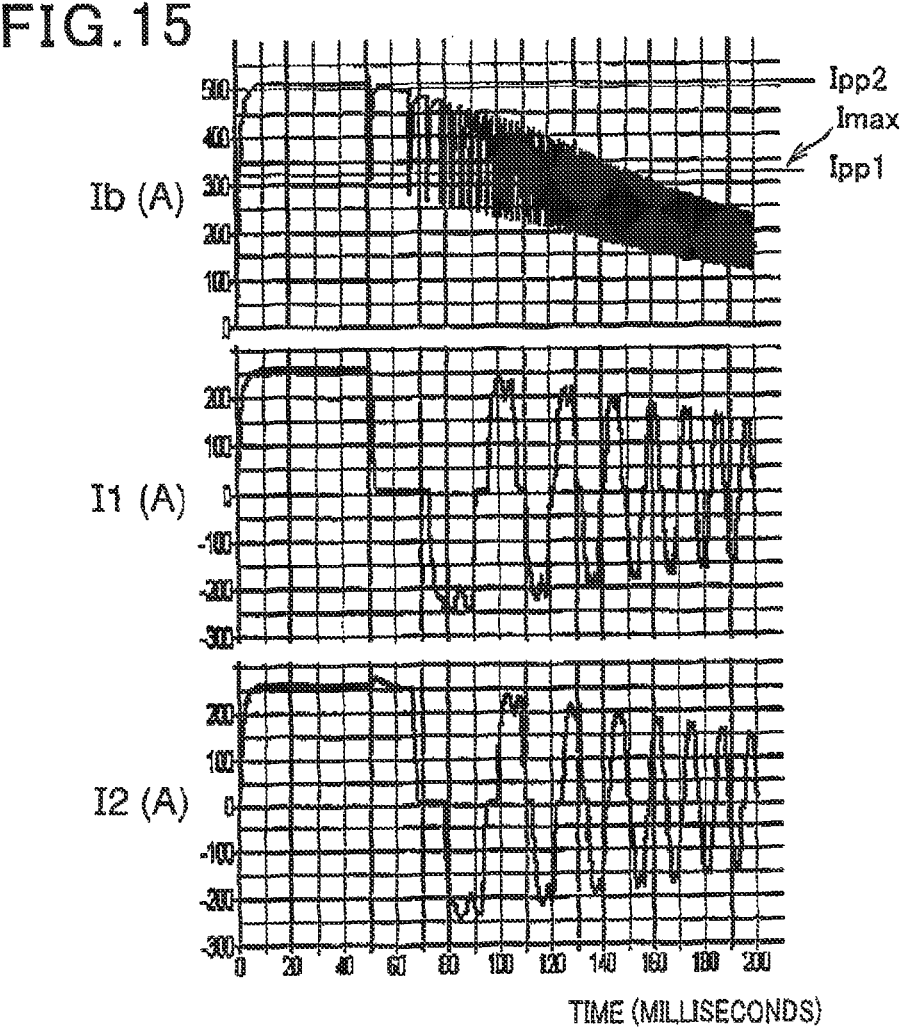
FIG. 15 is a graph schematically illustrating how an input current, a first output current, and a second a second output current flow when the three-phase windings of the first set and the three-phase windings of the second sets are simultaneously energized based on a predetermined conduction angle according to a comparison example.

In contrast, FIG. 15 schematically illustrates how the input current Ib, the first output current I1, and the second output current I2 flow when the first and second sets 30b1 and 30b2 of the three-phase windings (Lu, Lv, Lw) and (Lx, Ly, Lz) are simultaneously energized based on a predetermined conduction angle according to a conventional example.

FIG. 15 demonstrates that peak level Ipp2 of the input current Ib exceeds the allowable maximum current Imax set to the same value as the first embodiment.

Specifically, an impedance of a path, through which the input current Ib flows when the two sets 30b1 and 30b2 of the three-phase windings (Lu, Lv, Lw) and (Lx, Ly, Lz) are simultaneously energized based on a predetermined conduction angle according to the conventional example, will be referred to as a first impedance. In contrast, an impedance of a path, through which the input current Ib flows under control of the rotary electric machine 30 based on the combination pattern P4 having one non-energization mode, will be referred to as a second impedance.

At that time, the first impedance is smaller than the second impedance. For this reason, the peak level Ipp2 of the input current Ib under control of the rotary electric machine 30 according to the conventional example is larger than that of the input current Ib under control of the rotary electric machine 30 based on the combination pattern P4 set forth above.

Thus, if the first and second sets 30b1 and 30b2 of the three-phase windings (Lu, Lv, Lw) and (Lx, Ly, Lz) were energized based on the combination pattern P5 in place of the combination pattern P4, a peak level of the input current Ib might exceed the allowable maximum current Imax.

However, in the first embodiment, the rotary electric machine 30 is energized based on the combination pattern P4 from the start of energization. In other words, the set of the three-phase windings (Lu, Lv, Lw) is energized based on the combination pattern P4 from the start of energization. The set of the three-phase windings (Lu, Lv, Lw) has been energized based on the combination pattern P4 for the preset period since the start of energization of the rotary electric machine 30. This results in a voltage induced in each of the three-phase windings Lu, Lv, and Lz as a counter-electromotive force, so that the counter-electromotive force serves to reduce a peak level of the input current Ib.

Thus, when the peak level of the input current Ib has been sufficiently reduced for the preset period since the start of energization of the rotary electric machine 30, the combination pattern P4 is switched to the combination pattern P5, and thereafter the rotary electric machine 30 is energized based on the combination pattern P5. This makes it possible to prevent the peak level of the input current Ib from exceeding the allowable maximum current Imax while the first and second sets 30b1 and 30b2 of the three-phase windings (Lu, Lv, Lw) and (Lx, Ly, Lz) are energized based on the combination pattern P5.

As described above, the power converting device 20A according to the first embodiment is configured to control on-off operations of the switching elements S*# in accordance with a determined combination pattern of the first and second energization patterns Pa and Pb such that the peak level Ipp1 of the input current Ib is maintained to be equal to or lower than the allowable maximum current Imax (see FIGS. 10 and 14). However, the power converting device 20A according to the first embodiment is not limited to the configuration.

Specifically, the power converting device 20A according to a modification of the first embodiment can be configured to determine a combination pattern of the first and second energization patterns Pa and Pb based on change of values of the characteristic parameters PA, and control on-off operations of the switching elements S*# in accordance with the determined combination pattern. FIGS. 16 to 23 illustrate control examples by the power converting device 20A according to the modification. In FIGS. 16 to 23, reference characters t10, t20, t30, t40, and t60 each represent the timing of start of energization of the rotary electric machine 30 or the timing of resetting the rotary electric machine 30.

Figure 16:
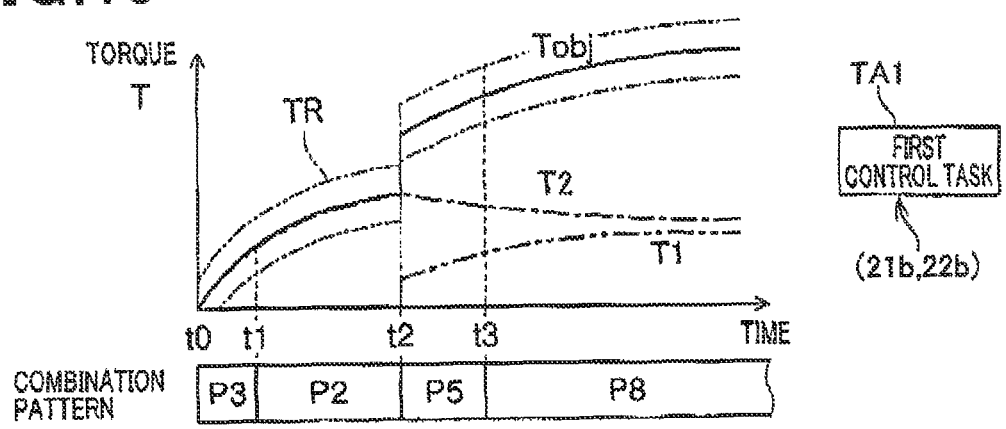
FIG. 16 is a view schematically illustrating how to switch between a plurality of combination patterns for the first and second sets of the three-phase windings depending on change of output torque of the rotary electric machine according to the first embodiment.
Figure 17:
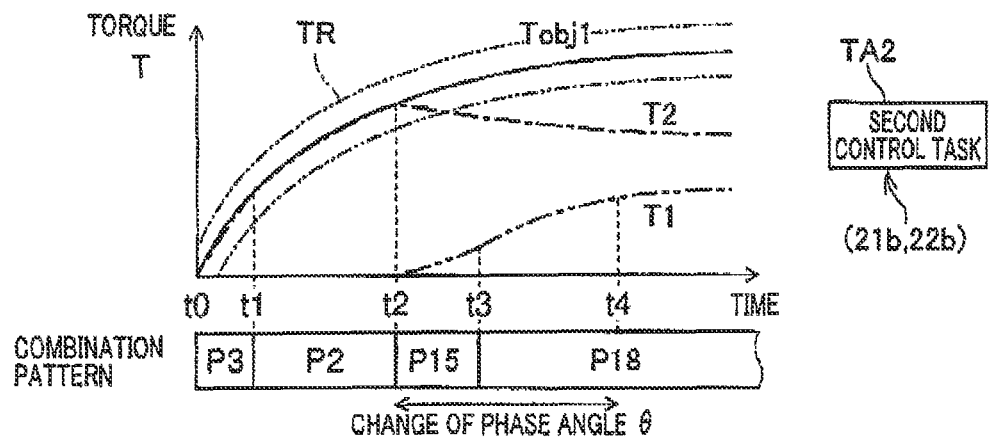
FIG. 17 is a view schematically illustrating how to switch between the plurality of combination patterns for the first and second sets of the three-phase windings depending on change of output torque of the rotary electric machine according to the first embodiment while at least partly changing a phase angle for the second set of the three-phase windings.

FIGS. 16 and 17 schematically illustrate how the output torque T, i.e. the first output torque T1 and the second output torque T2, changes based on change of a combination pattern of the first and second energization patterns Pa and Pb. The combination pattern is changed based on change of objective torque Tobj that the rotary electric machine 30 is needed to generate; the change of the objective torque Tobj is included in the control information.

FIG. 16 shows that each of the first and second controllers 21b and 22b is configured to perform a first control task TA1 to change the combination pattern between the first and second energization patterns Pa and Pb depending on change of the output torque T.

Specifically, the first control task TA1 is configured to:

determine the combination pattern P3 for the switching elements S*# listed in table 1 at time t0 to thereby control on-off operations of the switching elements S*# based on the determined combination pattern P3 during the duration from the time t0 to time t1;

at the time t2 to thereby control on-off operations of the switching elements S*# based on the determined combination pattern P5 during the duration from the time t2 to time t3; and switch the combination pattern for the switching elements S*# from the combination pattern P5 to the combination pattern P8 listed in table 1 at the time t3 to thereby control on-off operations of the switching elements S*# based on the determined combination pattern P8 after the time t3.

An absolute value of the second output torque T2 generated by the three-phase windings Lx, Ly and Lz in the 120-degree conduction mode is usually greater than that of the second output torque T2 in the 180-degree conduction mode. This is because the energized duration of the rotary electric machine 30 in the 120-degree conduction mode of the combination pattern P2 is shorter than that of the rotary electric machine 30 in the 180-degree conduction mode of the combination pattern P3. Thus, switching the combination pattern from the combination pattern P3 to the combination pattern P2 slightly reduces the gradient of an increase of the second output torque T2 (see dashed line for the period from the time t0 to the time t2 in FIG. 16). Note that, because the energization pattern for the three-phase windings Lu, Lv, and Lw is set to the non-energization mode based on each of the combination patterns P3 and P2, the first output torque T1 is zero (see two-dot chain line for the period from the time t0 to the time t2).

An absolute value of the first output torque T1 generated by the three-phase windings Lu, Lv, and Lw based on the combination pattern P5 is usually greater than that of the first output torque T1 based on the combination pattern P2. This is because the energization pattern for the three-phase windings Lu, Lv, and Lw is switched from the non-energization mode of the combination pattern P2 to the energization pattern in the 120-degree conduction mode of the combination pattern P5. Thus, switching the combination pattern from the combination pattern P2 to the combination pattern P5 increases the first output torque T1 (see two-dot chain line for the period from the time t1 to the time t3 in FIG. 16). Because the 120-degree conduction mode is maintained for the three-phase windings Lx, Ly, and Lz for the period from the time t1 to the time t3, the second output torque T2 is substantially unchanged (see dashed line for the period from the time t1 to the time t3 in FIG. 16).

An absolute value of the first output torque T1 generated by the three-phase windings Lu, Lv, and Lw based on the combination pattern P8 is usually greater than that of the first output torque T1 based on the combination pattern P5. This is because the energized duration of the rotary electric machine 30 in the 180-degree conduction mode of the combination pattern P8 is longer than that of the rotary electric machine 30 in the 120-degree conduction mode of the combination pattern P5. Thus, switching the combination pattern from the combination pattern P5 to the combination pattern P8 increases the first output torque T1 (see two-dot chain line for the period from the time t2 to the time t3 and for the period after the time t3). The 120-degree conduction mode is maintained for the three-phase windings Lx, Ly, and Lz although the combination pattern for the three-phase windings Lx, Ly, and Lxz is switched from the combination pattern P5 to the combination pattern P8. For this reason, the second output torque T2 is substantially unchanged (see dashed line for the period from the time t2 to the time t3 and for the period after the time t3).

That is, the first control task TA1 causes the first output torque T1 generated by the three-phase windings Lu, Lv, and Lw to change in the two-dot chain line, and the second output torque T2 generated by the three-phase windings Lx, Ly, and Lz to change in the dashed line. Because the output torque T is constructed by the sum of the first output torque T1 and the second output torque T2, the function FA1 causes the output torque T to substantially follow the trajectory of the objective torque Tobj (see solid line in FIG. 16).

If an allowable torque range TR is previously determined around the objective torque Tobj (see broken lines in FIG. 3), the function FA1 makes it possible to cause the output torque T of the rotary electric machine 30 to change within the allowable torque range TR including the objective torque Tobj.

The first control task TA1 maintains each of the phase angles θ1 and θ2 constant.

In contrast, FIG. 17 shows that each of the first and second controllers 21b and 22b is configured to perform a second control task TA2, which is similar to the first control task TA1. The second control task TA2 changes the combination pattern between the first and second energization patterns Pa and Pb while changing, for example, the phase angle θ2 for the period from the time t2 to time t4. That is, the second control task TA2 is configured to:

switch the combination pattern for the switching elements S*# from the combination pattern P2 to the combination pattern P15 listed in table 2 at the time t2 to thereby control on-off operations of the switching elements S*# based on the determined combination pattern P15 during the duration from the time t2 to time t3; and switch the combination pattern for the switching elements S*# from the combination pattern P15 to the combination pattern P18 listed in table 2 at the time t3 to thereby control on-off operations of the switching elements S*# based on the determined combination pattern P18 during the duration from the time t3 to the time t4; and switch the combination pattern for the switching elements S*# from the combination pattern P18 to the combination pattern P8 at the time t4 to thereby control on-off operations of the switching elements S*# based on the determined combination pattern P8 after the time t4.

The second control task TA2 gradually changes the output torque T in the trajectory of an objective torque Tobj1. Specifically, change of at least one of the phase angles θ1 and θ2 makes it possible to reduce sudden change of the output torque T.

Figure 18:
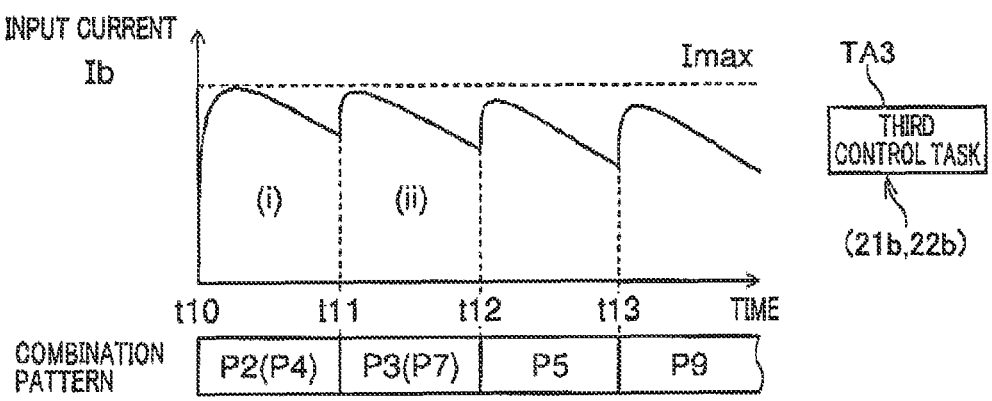
FIG. 18 is a view schematically illustrating an example of how to switch between the plurality of combination patterns for the first and second sets of the three-phase windings depending on change of the input current according to the first embodiment.
Figure 19:
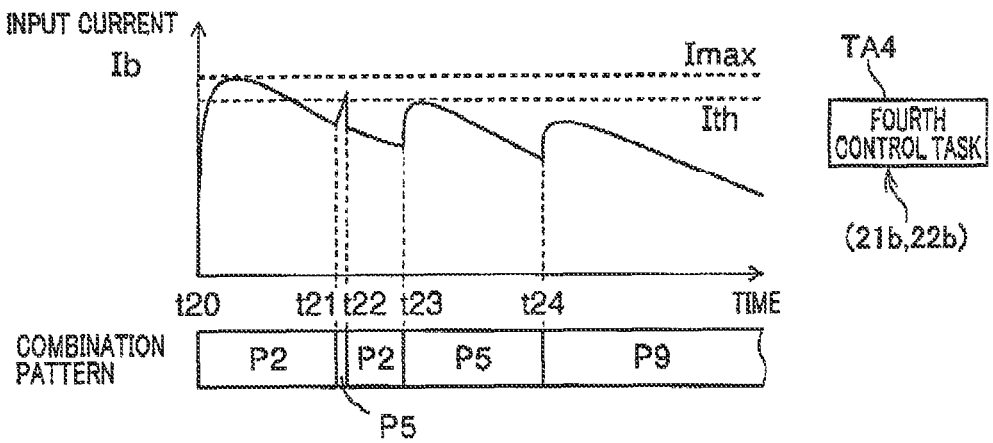
FIG. 19 is a view schematically illustrating another example of how to switch between the plurality of combination patterns for the first and second sets of the three-phase windings depending on change of the input current according to the first embodiment.

FIGS. 18 and 19 schematically illustrate how the input current Ib changes based on change of a combination pattern of the first and second energization patterns Pa and Pb. The combination pattern is changed based on a relationship between the input current Ib and the allowable maximum current Imax.

FIG. 18 shows that each of the first and second controllers 21b and 22b is configured to perform a third control task TA3 to change the combination pattern between the first and second energization patterns Pa and Pb such that a peak level of the input current Ib is maintained to be equal to or lower than the allowable maximum current Imax.

Specifically, the third control task TA3 is configured to:

determine the combination pattern P2 or P4 for the switching elements S*# listed in table 1 at time t10 to thereby control on-off operations of the switching elements S*# based on the determined combination pattern P2 or P4 during the duration from the time t10 to time t11;

switch the combination pattern for the switching elements S*# from the combination pattern P2 or P4 to the combination pattern P3 or P7 listed in table 1 at the time t11 to thereby control on-off operations of the switching elements S*# based on the determined combination pattern P3 or P7 during the duration from the time t11 to time t12;

switch the combination pattern for the switching elements S*# from the combination pattern P3 or P7 to the combination pattern P5 at the time t12 to thereby control on-off operations of the switching elements S*# based on the determined combination pattern P5 during the duration from the time t12 to time t13; and switch the combination pattern for the switching elements S*# from the combination pattern P5 to the combination pattern P9 listed in table 1 at the time t13 to thereby control on-off operations of the switching elements S*# based on the determined combination pattern P9 after the time t13.

Note that a impedance of a path, through which the input current Ib flows under control of the rotary electric machine 30 based on the combination pattern P2 or P4 having one non-energization mode and 120-degree conduction mode, will be referred to as a third impedance. An impedance of a path, through which the input current Ib flows under control of the rotary electric machine 30 based on the combination pattern P3 or P7 having one non-energization mode and 180-degree conduction mode, will be referred to as a fourth impedance.

At that time, the third impedance is larger than the fourth impedance. For this reason, a peak level of the input current Ib under control of the rotary electric machine 30 based on the combination pattern P3 or P7 is larger than that of the input current Ib under control of the rotary electric machine 30 based on the combination pattern P2 or P4.

Thus, one set of the three-phase windings (Lu, Lv, Lw) or (Lx, Ly, Lz) is energized based on the combination pattern P2 or P4 from the start of energization of the rotary electric machine 30 (see the time t10). The one set of the three-phase windings (Lu, Lv, Lw) or (Lx, Ly, Lz) has been energized based on the combination pattern P2 or P4 for the period from the time t11 to time t10 since the start of energization of the rotary electric machine 30. This results in a voltage induced in the three-phase windings (Lu, Lv, Lz) or (Lx, Ly, Lz) as a counter-electromotive force, so that the counter-electromotive force serves to reduce a peak level of the input current Ib.

Thus, when the peak level of the input current Ib has been sufficiently reduced for the period from the time t11 to time t10 since the start of energization of the rotary electric machine 30, the combination pattern P2 or P4 is switched to the combination pattern P3 or P7. Thereafter, the rotary electric machine 30 is energized based on the combination pattern P3 or P7. This makes it possible to prevent the peak level of the input current Ib, while one set of the three-phase windings (Lu, Lv, Lw) or (Lx, Ly, Lz) is energized based on the combination pattern P3 or P7, from exceeding the allowable maximum current Imax (see FIG. 18).

Similarly, an impedance of a path, through which the input current Ib flows under control of the rotary electric machine 30 based on the combination pattern P5 in which the first and second sets 30b and 30b2 of the three-phase windings (Lu, Lv, Lw) and (Lx, Ly, Lz) are simultaneously energized based on the 120-degree conduction mode, will be referred to as a fifth impedance.

Like the relationship between the first impedance and the second or third impedance, the fifth impedance is smaller than the fourth impedance. For this reason, a peak level of the input current Ib under control of the rotary electric machine 30 based on the combination pattern P5 is larger than that of the input current Ib under control of the rotary electric machine 30 based on the combination pattern P3 or P7.

As described above, when the peak level of the input current Ib has been sufficiently reduced by a counter-electromagnetic force induced in the three-phase windings (Lu, Lv, Lz) or (Lx, Ly, Lz) for the period from the time t12 to time t11, the combination pattern P3 or P7 is switched to the combination pattern P5. Thereafter, the rotary electric machine 30 is energized based on the combination pattern P5. This makes it possible to prevent the peak level of the input current Ib while the first and second sets 30b1 and 30b2 the three-phase windings (Lu, Lv, Lw) and (I, Ly, Lz) are energized based on the combination pattern P5 from exceeding the allowable maximum current Imax (see FIG. 18).

An impedance of a path, through which the input current Ib flows under control of the rotary electric machine 30 based on the combination pattern P9 in which the first and second sets 30b1 and 30b2 of the three-phase windings (Lu, Lv, Lw) and (Lx, Ly, Lz) are simultaneously energized based on the 180-degree conduction mode, will be referred to as a sixth impedance.

Like the relationship between the third impedance and the fourth impedance, the sixth impedance is smaller than the fifth impedance. For this reason, a peak level of the input current Ib under control of the rotary electric machine 30 based on the combination pattern. P9 is larger than that of the input current Ib under control of the rotary electric machine 30 based on the combination pattern P5.

As described above, when the peak level of the input current Ib has been sufficiently reduced by a counter-electromagnetic force induced in each of the three-phase windings (Lu, Lv, Lz) and (Lx, Ly, Lz) for the period from the time t13 to time t12, the combination pattern P5 is switched to the combination pattern P9. Thereafter, the rotary electric machine 30 is energized based on the combination pattern P9. This makes it possible to prevent the peak level of the input current Ib while the first and second sets 30b1 and 30b2 of the three-phase windings (Lu, Lv, Lw) and (Lx, Ly, Lz) are energized based on the combination pattern 95 from exceeding the allowable maximum current Imax (see FIG. 18).

The third control task TA3 determines the combination pattern P2 or P4 during the period (i) from the time t10 to the time t11, and determines the combination pattern P3 or P7 during the period (ii) from the time t11 to the time t12.

A modification of the third control task TA3 can be configured to:

select, based on the temperature Te of each of the rotary electric machine 30 and the power converting device 20A, any one of the combination patterns P2 and P4 during the period (i); and select one of the combination patterns P3 and P7 during the period (ii) to satisfy the following condition.

The condition is that the three-phase windings driven by the determined combination pattern during the period (i) are different from the three-phase windings driven by the determined combination pattern during the period (ii).

An example of the modification of the third control task TA3 can be configured to:

select or determine the combination pattern P2 that drives the three-phase windings Lx, Ly, and Lz as one set of the two sets 30b1 and 30b2 of three-phase windings (Lu, Lv, Lw) and (Lx, Ly, Lz) during the period (i); and select or determine the combination pattern P7 that drives the three-phase windings Lu, Lv, and Lw as the other set of the two sets 30b1 and 30b2 of three-phase windings (Lu, Lv, Lw) and (Lx, Ly, Lz) during the period (ii).

This modification prevents heat generation from being concentrated in only one set of the two sets 30b1 and 30b2 of three-phase windings (Lu, Lv, Lw) and (Lx, Ly, Lz) if the rotary electric machine 30 is required to be used within a strict temperature range. This modification can be applied to other pairs in all the combination patterns.

FIG. 18 shows that, even if the combination pattern P5 was set at the time t11 after the combination pattern P2 determined at the time t10, a peak level of the input current Ib would be maintained to be equal to or lower than the allowable maximum current Imax.

In contrast, there may be a case where the combination pattern P5 determined at time t21 after the combination pattern P2 determined at time t20 may cause a peak level of the input current Ib to exceed the allowable maximum current Imax. The reason is, for example, that it is difficult to accurately estimate an impedance of a path through which the input current Ib flows under control of the rotary electric machine 30 based on the determined combination pattern. If the actual impedance of the path was lower than the estimated impedance, the input current Ib might exceed the allowable maximum current Imax under control of the rotary electric machine 30 based on the determined combination pattern.

In order to address such a case, FIG. 19 shows that each of the first and second controllers 21b and 22b is configured to perform a fourth control task TA4. The fourth control task TA4 is designed to:

determine whether a peak level of the input current Ib exceeds a threshold level Ith set to be lower than the allowable maximum current Imax after a previous combination pattern has been switched to a current combination pattern; and switch the current combination pattern to the previous combination pattern again if it is determined that the peak level of the input current Ib exceeds the threshold level Ith.

Specifically, as illustrated in FIG. 19, after the previous combination pattern P2 has been switched to a current combination pattern P5 at time t21, the fourth control task TA4 is designed to determine that a peak level of the input current Ib exceeds the threshold level Ith at time t22. Thus, the fourth control task TA4 is designed to switch the current combination pattern P5 to the previous combination pattern P2 again at the time t22, and controls on-off operations of the switching elements S*# based on the combination pattern P2 during the duration from the time t22 to time t23. This reduces the input current Ib so that the input current Ib is maintained to be equal to or lower than the threshold level Ith.

The fourth control task TA4 is also designed to switch the combination pattern for the switching elements S*# from the combination pattern P2 to the combination pattern P5 again at the time t23 to thereby control on-off operations of the switching elements S*# based on the determined combination pattern P5 during the duration from the time t23 to time t24.

The fourth control task TA4 is further designed to switch the combination pattern for the switching elements S*# from the combination pattern P5 to the combination pattern P9 at the time t24 to thereby control on-off operations of the switching elements S*# based on the determined combination pattern P9 after the time t24.

The fourth task TA4 reliably prevents the currents the current b from exceeding the allowable maximum current Imax.

The fourth control task TA4 can be designed to:

determine whether a peak level of the input current Ib exceeds a threshold level Ith set to be lower than the allowable maximum current Imax after a previous combination pattern has been switched to a current combination pattern; and switch the current combination pattern to another combination pattern again if it is determined that the peak level of the input current Ib exceeds the threshold level Ith. A peak level of the input current Ib based on the switched combination pattern is lower than that of the input current Ib based on the current combination pattern.

If the rotary electric machine 30 is required to be used within a strict temperature range, the modification of the third control task TA3 can be carried out.

Figure 20:
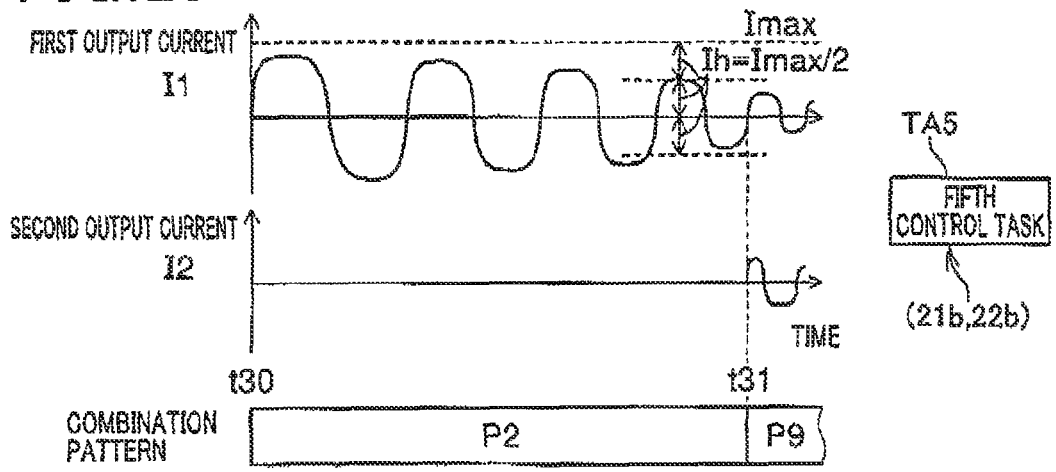
FIG. 20 is a view schematically illustrating an example of how to switch between the plurality of combination patterns for the first and second sets of the three-phase windings depending on change of each of the first output current and the second output current according to the first embodiment.

FIG. 20 schematically illustrates how the first and second output currents I1 and I2 change based on change of a combination pattern of the first and second energization patterns Pa and Pb.

FIG. 20 shows that each of the first and second controllers 21b and 22b is configured to perform a fifth control task TA5 to change the combination pattern between the first and second energization patterns Pa and Pb depending on change of each of the first and second output currents I1 and I2.

Specifically, the fifth control task TA5 is configured to:

determine the combination pattern P2 for the switching elements S*# at time t30 to thereby control on-off operations of the switching elements S*# based on the determined combination pattern P2 after the time t30;

determine whether a peak level of the first output current I1 becomes equal to or lower than a current threshold level Ih that is half of the allowable maximum current Imax; and switch the combination pattern for the switching elements S*# from the combination pattern P2 using the 120-degree energization mode for the three-phase windings Lx, Ly, and Lz and the non-energization mode to the combination pattern P9 using the 180-degree energization pattern for each of the first and second sets 30b1 and 30b2 of the three-phase windings (Lu, Lv, Lw) and (Lx, Ly, Lz) if it is determined that the peak level of the first output current I1 becomes equal to or lower than the current threshold level Ih.

Using half of the allowable maximum current Imax as the current threshold level Ih by the fifth control task TA5 achieves the following technical advantage. Specifically, the technical advantage is that it is possible to reliably maintain a peak level of the input current Ib, i.e. the sum of the first and second output currents I1 and I2, to be equal to or lower than the allowable maximum current Imax even if the combination pattern is switched from a combination pattern using only one set of three-phase windings, such as the combination pattern P2, P3, P4, or P7 to a combination pattern using both the two sets of the three-phase windings, such as the combination pattern P5, P6, P8, or P9.

Figure 21:
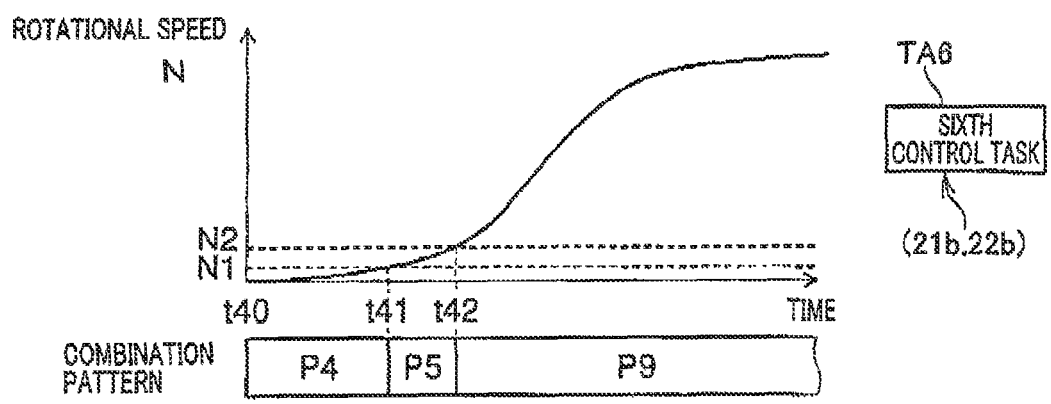
FIG. 21 is a view schematically illustrating an example of how to switch between the plurality of combination patterns for the first and second sets of the three-phase windings depending on change of a rotational speed of a rotor of the rotary electric machine according to the first embodiment.

FIG. 21 schematically illustrates how the rotational speed N of the rotor 30a changes based on change of a combination pattern of the first and second energization patterns Pa and Pb.

FIG. 21 shows that each of the first and second controllers 21b and 22b is configured to perform a sixth control task TA6 to change the combination pattern between the first and second energization patterns Pa and Pb depending on change of the rotational speed N of the rotor 30a. As described above, the sixth control task TA6 is designed based on the fact that, the higher a voltage induced in the stator is as the back electromotive force, the lower a value of the input current Ib is. Because the voltage induced in the stator is proportional to the rotational speed N of the rotor 30a, the sixth control task TA6 aims to improve the controllability of the input current Ib.

In the first embodiment, a value of the rotational speed N at which a value of the voltage induced in the stator in and around which the two sets 30b1 and 30b2 of the three-phase windings (Lu, Lv, Lw) and (Lx, Ly, Lz) are wound becomes equal to or higher than the rated voltage of the power source 10 is referred to as a first threshold rotational speed N1. A value of the rotational speed N at which a value of the voltage induced in the stator becomes equal to or higher than the rated voltage of the power source 10 is also referred to as a second threshold rotational speed N2.

Specifically, the sixth control task TA6 is configured to:

determine the combination pattern P4 for the switching elements S*# at time t40 when the rotational speed N of the rotor 30a is zero to thereby control on-off operations of the switching elements S*# based on the determined combination pattern P4 after the time t40;

switch the combination pattern for the switching elements S*# from the combination pattern P4 to the combination pattern P5 at time t41 when the rotational speed N of the rotor 30a reaches the first threshold rotational speed N1 to thereby control on-off operations of the switching elements S*# based on the determined combination pattern P5 after the time t41; and switch the combination pattern for the switching elements S*# from the combination pattern P5 to the combination pattern P9 at time t42 when the rotational speed N of the rotor 30a reaches the second threshold rotational speed N2 to thereby control on-off operations of the switching elements S*# based on the determined combination pattern P9 after the time t42.

The rotor 30a can be designed as a permanent-magnet rotor whose permanent magnets form the preset pair(s) of N and S poles or as a field-winding rotor. If the field-winding rotor is used as the rotor 30a, a value of the voltage induced in the stator changes depending on the level of a field current supplied to flow through field windings wound in and around the rotor 30a. For this reason, the value of each of the first and second threshold rotational speeds N1 and N2 can be adjusted based on the level of the field current as a parameter.

Figure 22:
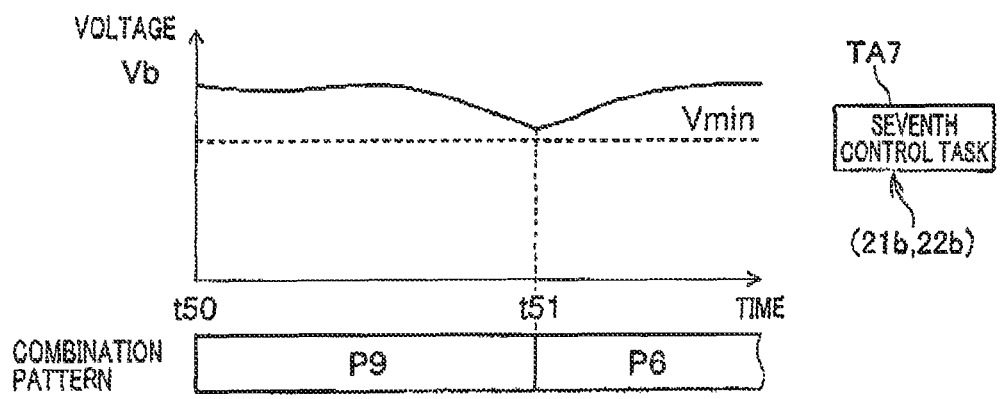
FIG. 22 is a view schematically illustrating an example of how to switch between the plurality of combination patterns for the first and second sets of the three-phase windings depending on change of a voltage of a power source according to the first embodiment.

FIG. 22 schematically illustrates how the voltage Vb of the power source 10 changes based on change of a combination pattern of the first and second energization patterns Pa and Pb.

FIG. 22 shows that each of the first and second controllers 21b and 22b is configured to perform a seventh control task TA7 to change the combination pattern between the first and second energization patterns Pa and Pb depending on change of the voltage Vb of the power source 10.

The power source 10 can supply power to other devices in addition to the power converting device 20A, so that the voltage Vb of the power source 10 is easily variable. If the voltage Vb of the power source 10 was below a predetermined minimum voltage Vmin, there might be adverse effects on the other devices in addition to the power converting device 20A. In order to address such a problem, the seventh control task TA7 aims to change the combination pattern to maintain the voltage Vb being equal to or higher than the minimum voltage Vmin.

Specifically, the seventh control task TA7 is configured to:

determine the combination pattern P4 for the switching elements S*# at time t50 to thereby control on-off operations of the switching elements S*# based on the determined combination pattern P9 after the time t50;

determine whether a level of the voltage Vb has decreased to be close to the minimum voltage Vmin; and switch the combination pattern for the switching elements S*# from the combination pattern P9 to the combination pattern P6 at time t51 when it is determined that the level of the voltage Vb has decreased to be close to the minimum voltage Vmin at the time t51; the conduction angle δ of the combination pattern P6 is smaller than that of the combination pattern P9.

This combination-pattern switching causes the conduction angle δ to decrease, thus reducing the first and second output currents I1 and I2. The reduction of the first and second output currents I1 and I2 prevents the voltage Vb from being below the minimum voltage Vmin.

The seventh control task TA7 therefore makes it possible to maintain the voltage Vb of the power source 10 equal to or higher than the minimum voltage Vmin.

Note that at least one of the first to seventh control tasks TA1 to TA7 can be performed by each of the first and second controllers 21b and 22b simultaneously with the combination-pattern determining routine illustrated in FIG. 10 or independently of the combination-pattern determining routine illustrated in FIG. 10.

The power converting device 20A can be configured to determine a combination pattern of the first and second energization patterns Pa and Pb based on change of values of other parameters included in the characteristic parameters PA; the other parameters are different from the output torque T, the input current Ib, the output currents I1 and I2, and the rotational speed N. For example, the other parameters can include the input voltage Vin1 input to the first power converter 21a, the input voltage Vin2 input to the second power converter 22a, the efficiency η of converted power from the power converting device 20A relative to input power to the power converting device 20A, and the temperature Te of each of the rotary electric machine 30 and the power converting device 20A.

The power converting device 20A can be configured to determine a combination pattern of the first and second energization patterns Pa and Pb based on combinations of the changes of values of some of the characteristic parameters PA.

Figure 23:
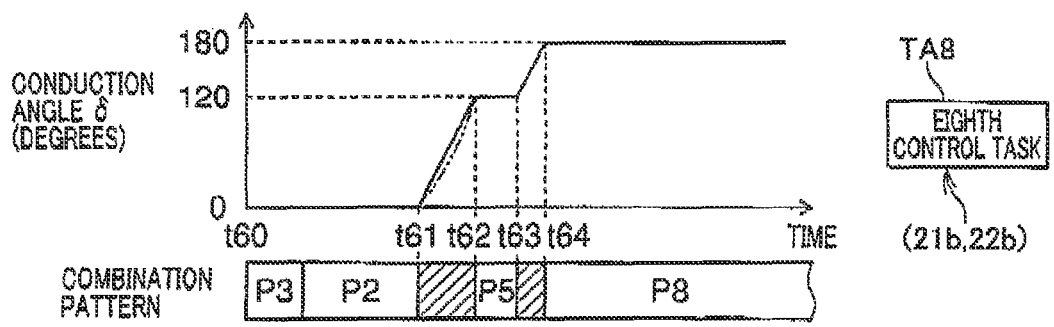
FIG. 23 is a view schematically illustrating how to change a conduction angle while a current combination pattern is switched to a next combination pattern according to the first embodiment.

When switching the current combination pattern to a next combination pattern, the power converting device 20A can gradually change, i.e. gradually decrease or gradually increase, the conduction angle δ as illustrated in FIG. 23.

Specifically, FIG. 23 shows that each of the first and second controllers 21b and 22b is configured to perform an eighth control task TA8 to change the combination pattern depending on change of the output torque T in the same manner as the first control task TA1 illustrated in FIG. 16.

Specifically, the eighth control task TA8 is configured to:

gradually increase the conduction angle δ from 0 electrical degrees to 120 electrical degrees while switching the combination pattern P2 to the combination pattern P5 (see the duration from time 61 to t62); and gradually increase the conduction angle δ from 120 electrical degrees to 180 electrical degrees while switching the combination pattern P5 to the eighth combination pattern P8 (see the duration from time t63 to time t64).

Like the gradual increase, the eighth control task TA8 can be configured to gradually increase or decrease the conduction angle δ linearly (see solid line) or curvedly (see two-dot chain line).

The eighth control task TA8 makes it possible to change the combination pattern such that an actual value of at least one of the characteristic parameters PA follows the trajectory of a target value of the corresponding at least one of the characteristic parameters PA while preventing a temporal grate variation of the actual value. Preferably, the so eighth control task TA8 changes the combination pattern such that the difference between an actual value of at least one of the characteristic parameters PA and a target value of the corresponding at least one of the characteristic parameters PA is within an allowable range.

Second Embodiment

A power converting device 20B and a power converting system 100B according to a second embodiment of the present disclosure will be described with reference to FIG. 24.

The structure and/or functions of the power converting device 20B and the power converting system 100B according to the second embodiment are different from the power converting device 20A and the power converting system 100A according to the first embodiment by the following points. So, the different points will be mainly described hereinafter.

The power converting device 20A according to the first embodiment includes the first controller 21b provided for controlling the first power converter 21a, and the second controller 22b provided for controlling the second power converter 22a.

In contrast, the power converting device 20B includes a controller 20b for controlling the first power converter 21a and the second power converter 22a. That is, the controller 20b includes the functions of the first and second controllers 21b and 22b set forth above.

Other structures and functions of the power converting device 20B and the power converting system 100B are substantially identical to those of the power converting device 20A and the power converting system 100A according to the first embodiment.

Third Embodiment

A power converting system 100C according to a third embodiment of the present disclosure will be described with reference to FIG. 25.

The structure and/or functions of the power converting system 100C according to the third embodiment are different from the power converting system 100A according to the first embodiment by the following points, So, the different points will be mainly described hereinafter.

The power converting system 100O includes an integrated module M1 in which a power converting device 20 and the rotary electric machine 30 are integrated with each other. The power converting device 20 is identical to the power converting device 20A illustrated in FIG. 1 or the power converting device 20B illustrated in FIG. 24. The rotary electric machine 30 is identical to that illustrated in FIG. 1.

Figure 24:
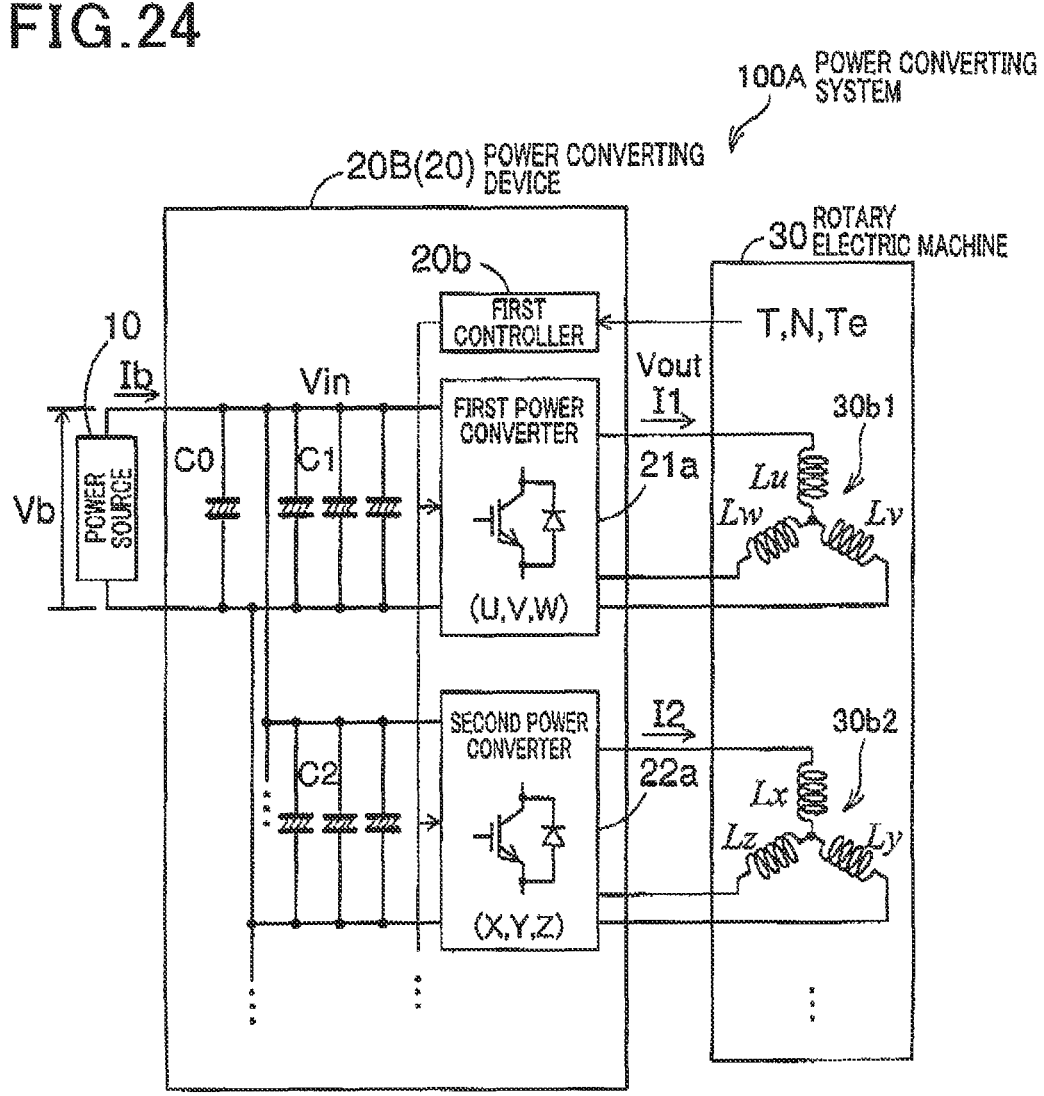
FIG. 24 is a schematic circuit diagram of a power converting system including a power converting device and a rotary electric machine according to a second embodiment of the present disclosure.

The power converting device 20 of the power converting system 100C includes a capacitor Cx in place of the capacitors C0, C1, and C2 illustrated in FIG. 1 or 24. Specifically, the capacitor Cx is connected to the positive and negative terminals of the power source 10 in parallel to the power source 10. The capacitance of the capacitor Cx is preferably set to be equal to the total capacitance of the capacitors C0, C1, and C2 illustrated in FIG. 1 or FIG. 24. The capacitance Cx can be connected in parallel to the capacitor C0 of the power converting device 20A or 20B.

Figure 26:
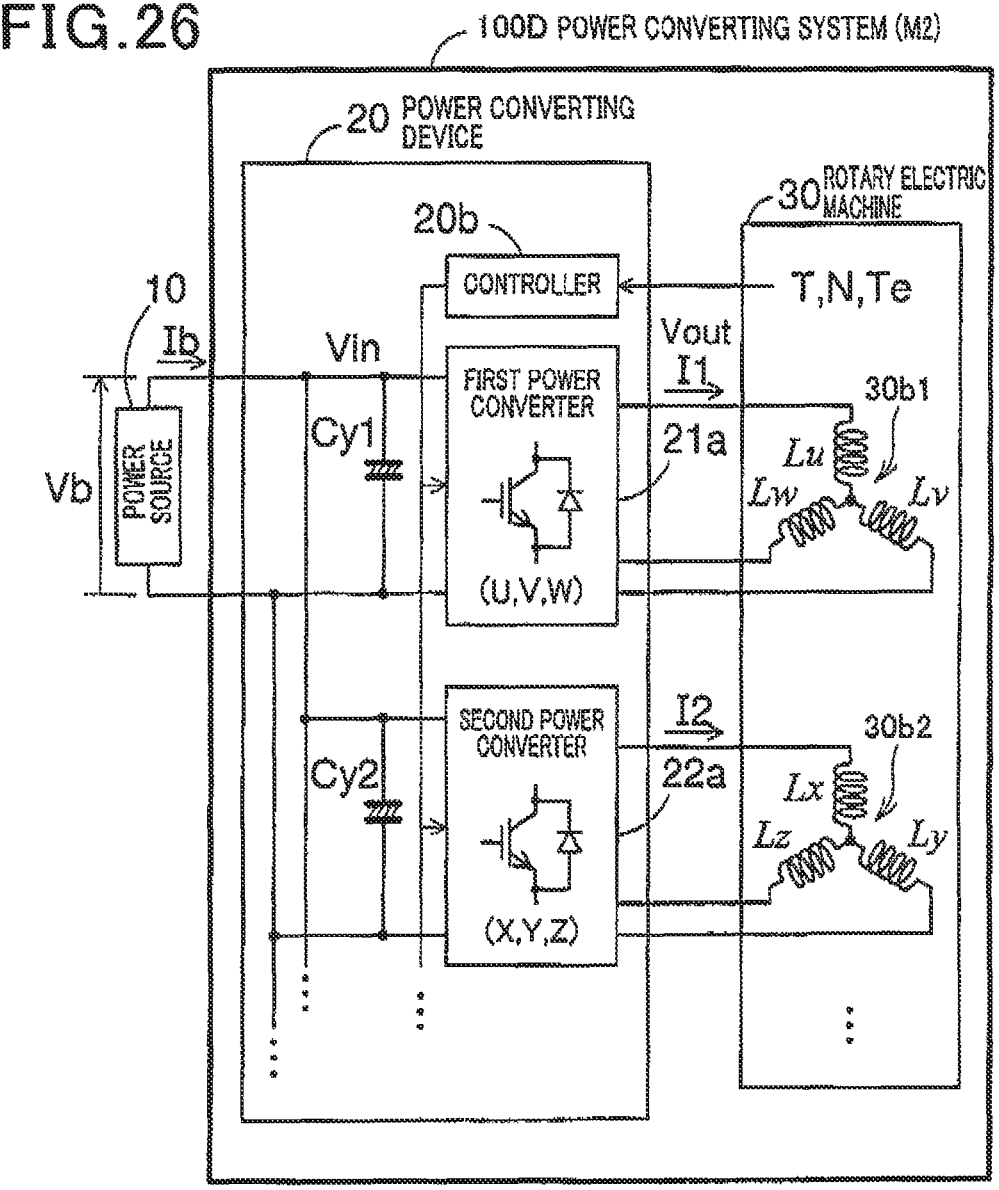
FIG. 26 is a schematic circuit diagram of a power converting system including a power converting device and a rotary electric machine according to a modification of the power converting system illustrated in FIG. 25.

FIG. 26 schematically illustrates a power converting system 100D as a modification of the power converting system 100O.

The power converting system 100D includes an integrated module M2 in which a power converting device 20 and the rotary electric machine 30 are integrated with each other. The power converting device 20 is identical to the power converting device 20A illustrated in FIG. 1 or the power converting device 20B illustrated in FIG. 24. The rotary electric machine 30 is identical to that illustrated in FIG. 1.

The power converting device 20 of the power converting system 100D includes capacitors Cy1 and Cy2. The capacitor Cy1 is connected to the positive and negative input terminals of the first power converter 21a in parallel to the first power converter 21a. The capacitor Cy2 is connected to the positive and negative input terminals of the second power converter 22a in parallel to the second power converter 22a. The capacitance of the capacitor Cy1 is preferably set to be equal to the total capacitance of the first set of the capacitors C1, and the capacitance of the capacitor Cy2 is preferably set to be equal to the total capacitance of the second set of the capacitors C2. The capacitance Cy1 can be connected in parallel to the first set of the capacitors C1 of the power converting device 20A or 20B, and the capacitance Cy2 can be connected in parallel to the second set of the capacitors C2 of the power converting device 20A or 20B.

Next, technical effects achieved by the power converting device 20A will be described hereinafter. Note that the technical effects achieved by each of the power converting devices 20 and 20B are identical to those achieved by the power converting device 20A.

The power converting device 20A is connected between the power source 10 and the first and second sets of the three-phase windings (Lu, Lv, Lw) and (Lx, Ly, Lz), which are parallely connected to each other.

The power converting device 20A is configured to:

repetitively determine, i.e. select, a combination pattern of the first energization pattern Pa for energization of the three-phase windings Lu, Lv, and Lz and the second energization pattern Pb for energization of the three-phase windings Lx, Ly, and Lz in the combination patterns P1 to P9 and P11 to P19 each of which includes at least an energization duration for the corresponding three-phase windings; and control on-off operations of the switching elements S*# of the first and second power converters 21a and 22a in accordance with the determined combination pattern (see FIGS. 8, 9, and 11 to 14, and tables 1 and 2).

This configuration adjusts an impedance of a path through which the input current Ib flows; the path includes at least one of the first set 30b1 of the three-phase windings Lu, Lv, and Lw and the second set 30b2 of the three-phase windings Lx, Ly, and Lz according to the determined combination pattern. This makes it possible to control, i.e. reduce, the level of the input current Ib to be input to the power converting device 20A from the power source 10, thus improving the controllability of the input current Ib.

The power converting device 20A is also configured to repetitively determine a combination pattern of the first energization pattern Pa and the second energization pattern Pb in the combination patterns P1 to P9 and P11 to P19; the determined combination pattern causes the rotary electric machine 30 to generate a value of the output torque T that satisfies the request torque Treq or maximum value of the output torque T (see FIGS. 8 and 9, and steps S11 and S14 in FIG. 10). This configuration makes it possible to reduce the magnitude of the input current Ib to be input to the power converting device 20A while ensuring a value of the output torque T that satisfies the request torque Treq or maximum value of the output torque T.

The power converting device 20A is configured to control on-off operations of the switching elements S*# using pulse voltage each having a pulse width, i.e. a pulse duration, corresponding to energization duration of a corresponding phase winding without using PWM control. This results in elimination of the need to use relatively high-capacitance capacitors connected to the input of the power converting device 20A, resulting in prevention of an increase of the power converting device 20A in size due to their high-capacitance capacitors.

The power converting device 20A is configured to repetitively determine a combination pattern of the first energization pattern Pa and the second energization pattern Pb in the combination patterns P1 to P9 and P11 to P19 based on change of values of at least one of the characteristic parameters PA; the characteristic parameters PA represent the physical characteristics of the power converting system 100A depending on the operations of the rotary electric machine 30.

This configuration makes it possible to change the combination pattern for energization of at least one of the first set 30b1 of the three-phase windings (Lu, Lv, Lw) and the second set 30b2 of the three-phase windings (Lx, Ly, Lz) according to change of values of at least one of the characteristic parameters PA.

The characteristic parameters PA include:

the voltage Vb supplied from the power source 10;

the input voltage Vin input to the first power converter 21a based on the voltage Vb;

the input current Ib based on the voltage Vb to the first and second power converters 21a and 22a;

the input voltage Vin2 input to the second power converter 22a based on the voltage Vb;

the first output current I1 output from the first power converter 21a to be supplied to the three-phase windings Lu, Lv, and Lw;

the second output current I2 output from the second power converter 22a to be supplied to the three-phase windings Lx, Ly, and Lz;

the output torque T of the rotary electric machine 30;

the efficiency η of output power from each of the first and second converters 21a and 22a relative to input power to a corresponding one of the first and second converters 21a and 22a;

the rotational speed N, i.e. the RPM (Revolutions Per Minute) or RPS (Revolutions Per Second) of the rotor 30a of the rotary electric machine 30; and the temperature Te of each of the rotary electric machine 30 and the power converting device 20A.

The power converting device 20A is configured to determine a combination pattern of the first energization pattern Pa and the second energization pattern Pb in the combination patterns P1 to P9 and P11 to P19 such that the input current Ib is maintained to be equal to or lower than the allowable maximum current Imax (see FIG. 14 and tables 1 and 2).

This configuration limits the input current Ib to be equal to or lower than the allowable maximum current Imax. This limitation reduces an allowable current level required for: the power source 10; wires connecting between the power source 10, the power converting device 20A, and the rotary electric machine 30; the power converting device 20A; and the rotary electric machine 30. This results in reduction of the power converting system 100A in size as compared with conventional power converting systems.

The power converting device 20A is configured to determine a combination pattern of the first energization pattern Pa and the second energization pattern Pb in the combination patterns P1 to P9 and P11 to P19 such that the voltage Vb of the power source 10 is maintained to be equal to or higher than the minimum voltage Vmin (see FIG. 22 and tables 1 and 2).

This configuration stabilizes the output of the power source 10, thus preventing adverse effects on the other devices connected to the power source 10 in addition to the power converting device 20A due to drop of the voltage Vb below the minimum voltage Vmin.

The power converting device 20A is configured to:

repetitively determine one of the combination patterns P1, P5, and P9 for driving the switching elements S*# based on the same energization patterns; and control on-off operations of the switching elements S*# of the first and second power converters 21a and 22a in accordance with the determined combination pattern P1, P5 or P9 using a pulse voltage (see FIGS. 11 to 14, and tables 1 and 2) when one or more predetermined conditions are satisfied.

For example, the predetermined conditions can include:

a condition that values of predetermined parameters indicative of the power-supply capability of the power source 10, such as the capacity, the rated voltage, and the rated current of the power source 10, are higher than predetermined threshold values; and a condition that no other devices are connected in parallel to the power source 10.

This configuration results in simplification of the processing loads of the first and second controllers 21b and 22b. This configuration also makes it possible to match the waveform of the first output current I1 flowing through the three-phase windings Lu, Lv, and Lw with that of the second output current I2 flowing through the three-phase windings Lx, Ly, and Lz, resulting in reduction of noise due to the difference in waveform between the first output current I1 and the second output current I2.

The power converting device 20A is configured to repetitively determine at least one of:

a value for the conduction angle δ (see the combination patterns P1 to P9 listed in table 1); and a value for the phase angle θ indicative of the electrical phase correlation of the rotor 30a relative to the reference phase winding, i.e. the U-phase winding Lu, of the stator (see the combination patterns P11 to P19 listed in table 2).

The determined at least one of the value for the conduction angle δ and the value for the phase angle θ adjusts the output torque T to be within the allowable torque range TR determined around the objective torque Tobj (see FIG. 16). This configuration results in the output torque T of the rotary electric machine 30 being within the allowable torque range TR determined around the objective torque Tobj.

The first energization pattern Pa is set to one of the non-energization mode, the 120-degree energization mode, and the 180-degree energization mode for the three-phase windings Lu, Lv, and Lw. The second energization pattern Pb is set to one of the non-energization mode, the 120-degree energization mode, and the 180-degree energization mode for the three-phase windings Lx, Ly, and Lz.

This configuration causes simple adjustment of the conduction angle δ to limit the level of the input current Ib, resulting in an increase of the power converting device 20A in size as compared with using other measures to limit the level of the input current Ib.

The power converting device 20A is configured to, until a predetermined period has elapsed since the start of energization of the rotary electric machine 30 or the reset of the rotary electric machine 30, control on-off operations of the switching elements S*# of the first and second power converters 21a and 22a in accordance with a determined combination pattern from the start of energization of the rotary electric machine 30; the determined combination pattern includes the non-energization mode as any one of the first and second energization patterns Pa and Pb.

This configuration limits the input current Ib to be equal to or lower than the allowable maximum current Imax. This limitation reduces an allowable current level required for: the power source 10; wires connecting between the power source 10, the power converting device 20A, and the rotary electric machine 30; the power converting device 20A; and the rotary electric machine 30. This results in reduction of the power converting system 100A in size as compared with conventional power converting systems.

Figure 25:
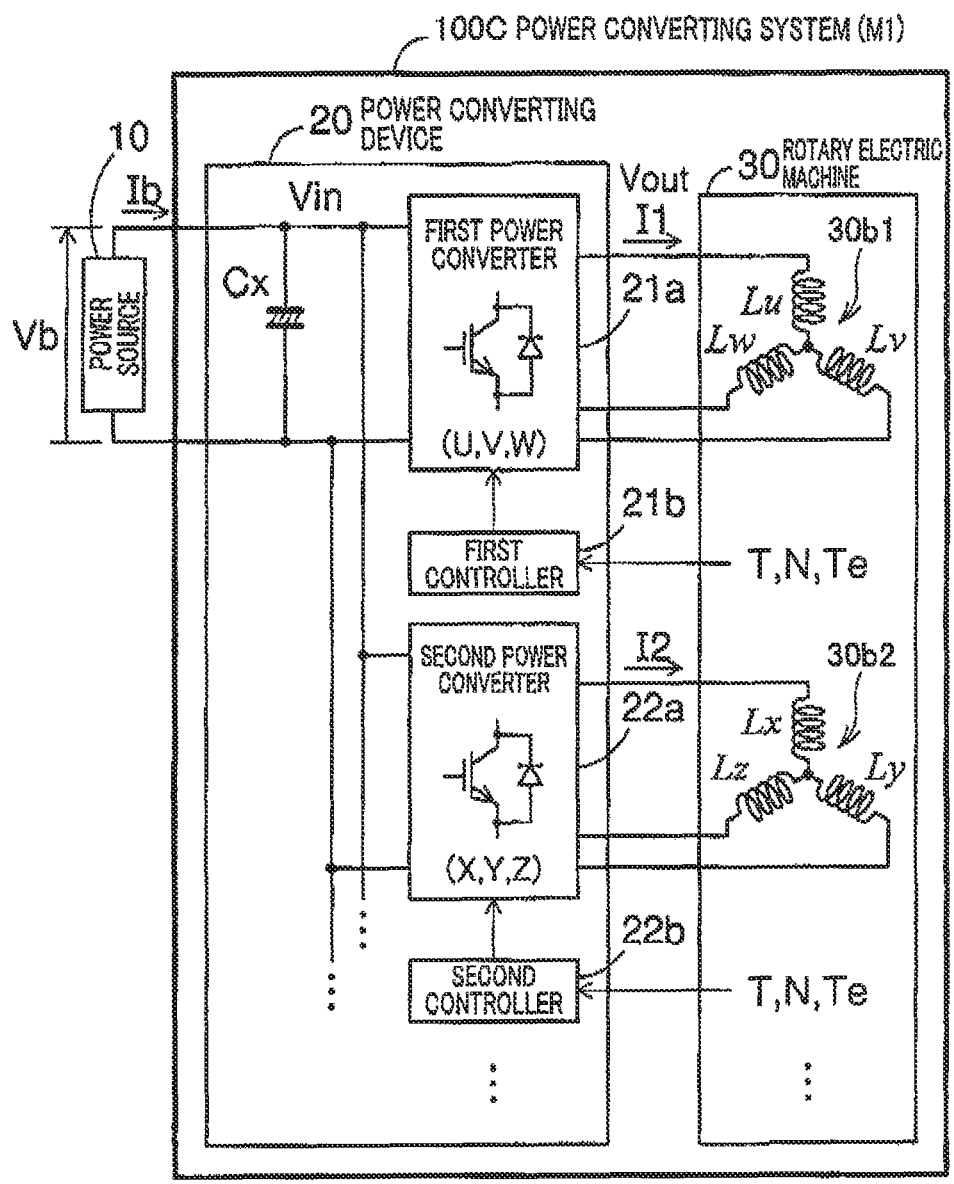
FIG. 25 is a schematic circuit diagram of a power converting system including a power converting device and a rotary electric machine according to a third embodiment of the present disclosure.

Each of the power converting system 100C and 100D is comprised of an integrated module M1 or M2 in which the power converting device 20 and the rotary electric machine 30 are integrated with each other (see FIG. 25 or 26). This configuration reduces each of the power converting systems 100C and 100D in size as compared with conventional power converting systems in which a power converting device and a rotary electric machine are separated.

Each of the power converting device 20B and 20 is configured such that the first controller 21b and the second controller 22b are integrate with each other as the controller 20b including the functions of the first controller 21b and those of the second controller 22b. This configuration reduces in size each of the power converting device 20B and 20.

The first to third embodiments of the present disclosure have been described, but the present disclosure is limited to the first to third embodiments. In other words, various modifications of each of the first to third embodiments can be carried out within the scope of the present disclosure.

Each of the first and second sets of the three-phase windings (Lu, Lv, Lw) and the three-phase windings (Lx, Ly, L) has the star(Y)-configuration or the delta(Δ)-configuration (see FIGS. 5 to 7). However, the present disclosure is not limited to the connection configurations.

Figure 27:
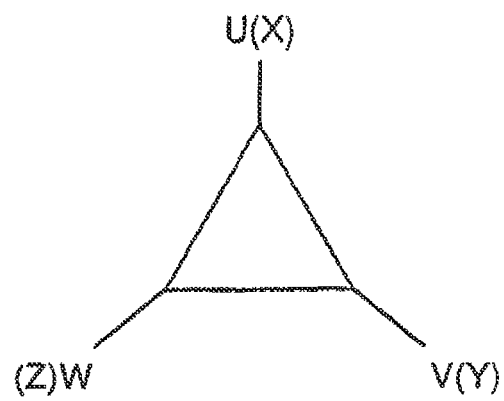
FIG. 27 is a view schematically illustrating a star-delta configuration for each of the first and second sets of the three-phase windings.

Specifically, at least one of the first and second sets of the three-phase windings (Lu, Lv, Lw) and the three-phase windings (Lx, Ly, Lz) has a star(Y)-delta(Δ) configuration (see FIG. 27). Although FIG. 27 eliminates illustration of the actual three-phase windings (Lu, Lv, Lw) and/or three-phase windings (Lx, Ly, Lz), the actual three-phase windings (Lu, Lv, Lw) and/or three-phase windings (Lx, Ly, Lz) can be connected to each other as disclosed in, for example, FIG. 6.

Each of the power converting systems according to the first to third embodiments is configured such that the rotary electric machine 30 is comprised of the first set 30b1 of the three-phase windings (Lu, Lv, Lw) and the second set 30b2 of the three-phase windings (Lx, Ly, Lz) (see FIGS. 1, and 24 to 26), but the present disclosure is not limited thereto.

Figure 28:
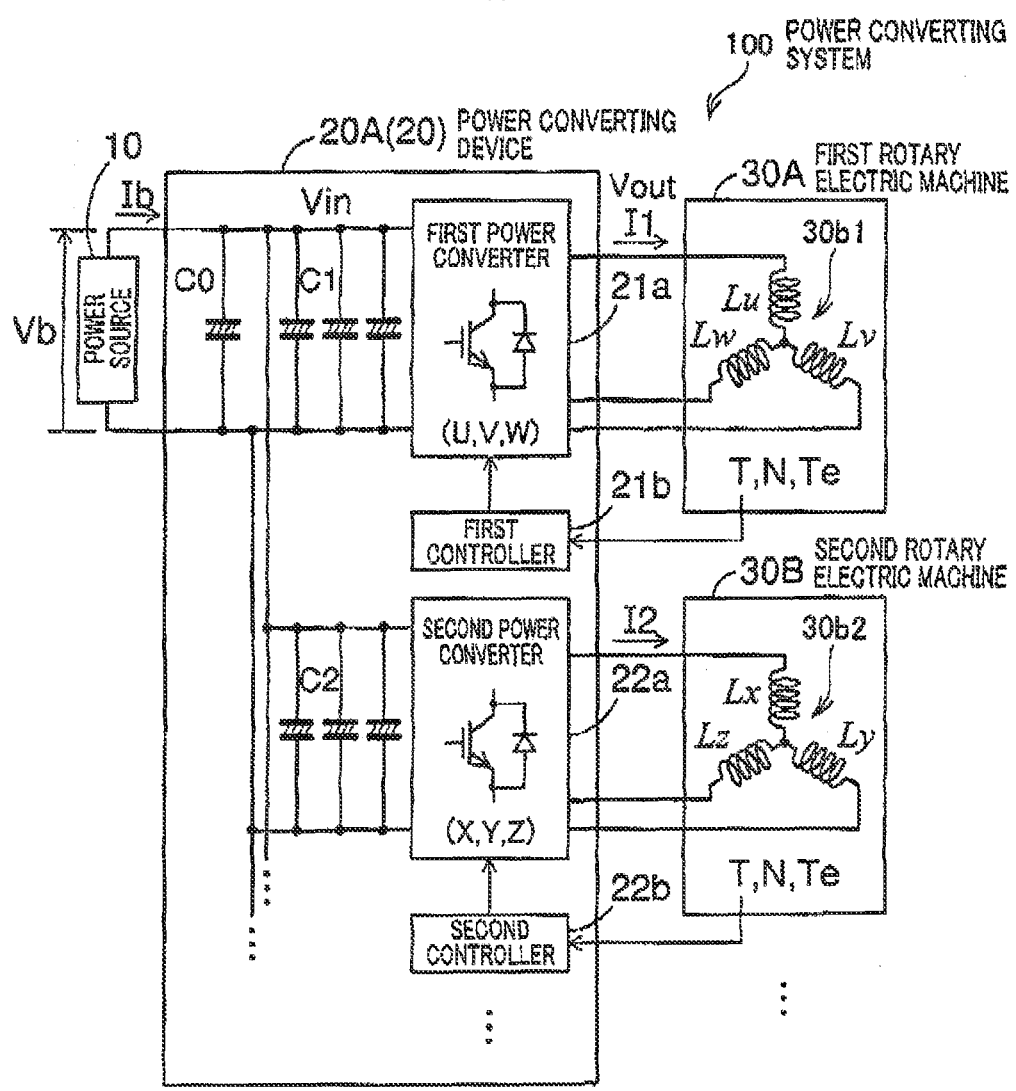
FIG. 28 is schematic circuit diagram of a power converting system including a power converting device and a rotary electric machine according to a modification of the power converting system illustrated in FIG. 1.

Specifically, a power converting system 100E according to a modification of the first embodiment is comprised of a first rotary electric machine 30A equipped with a rotor and the first set 30b1 of the three-phase windings (Lu, Lv, Lz), and a second rotary electric machine 30B equipped with the second set 30b2 of the three-phase windings (Lx, Ly, Lz) (see FIG. 28). The first power converter 21a and the first controller 21b are operative to energize the first set 30b1 of the three-phase windings (Lu, Lv, Lz), and the second power converter 22a and the second controller 22b are operative to energize the second set 30b2 of the three-phase windings (Lx, Ly, Lz). The first set 30b1 of the three-phase windings (Lu, Lv, Lw) and the second set 30b2 of the three-phase windings (Lx, Ly, Lz) can be provided in one of the first and second rotary electric machines 30A and 30B. The power converting system 100E according to the modification can achieve the same technical effects achieved by the power converting systems according to the first to third embodiments. This is because the rotor and stator of the first rotary electric machine 30A and those of the second rotary electric machine 30B of the power converting system 100E are different from each other, but the other structures are substantially identical to the corresponding structures of each of the power converting systems according to the first to third embodiments.

Each of the power converting systems according to the first to third embodiments is configured such that the rotary electric machine 30 is comprised of the first and second sets 30b1 and 30b2 of the three-phase windings (Lu, Lv, Lw) and (Lx, Ly, Lz) (see FIGS. 1, and 24 to 26), but the present disclosure is not limited thereto. Specifically, a modified power converting system can be configured such that the rotary electric machine 30 is comprised of three or more sets of three-phase windings. In the modified power converting system, it is necessary to provide a power converter identical to the power converter 21a or 22a for each of the three or more sets of the three-phase windings. A controller can be provided for control of each of the power converters as illustrated in FIG. 1, or a single controller can be provided for control of the power converters as illustrated in FIG. 24. The modified power converting system can achieve the same technical effects achieved by the power converting systems according to the first to third embodiments. This is because the number of sets of three-phase windings, the number of power converters, and the number of controllers of the modified power converting system are different from those of the power converting system 100A, but the other structures of the modified power converting system are substantially identical to the corresponding structures of the power converting system 100A.

In each of the power converting systems according to the first to third embodiments, a secondary battery is used as the power source 10, three-phase windings are applied to phase windings, and a motor-generator is applied to the rotary electric machine 30 (see FIGS. 1 and 24 to 26). However, the present disclosure is not limited to the applications.

Specifically, a solar cell, a fuel cell, or a commercial power source can be applied to the power source 10, or the combination of two or more cells in secondary cells, solar cells, and fuel cells can be applied to the power source 10. A single-phase winding or multiphase windings can be applied to the phase windings. A motor or the combination of a motor and a motor-generator can be applied to the rotary electric machine 30.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A power converting device for converting input power supplied from a power source, and supplying converted power to a rotary electric machine, the rotary electric machine including at least a first set of at least one-phase winding and a second set of at least one-phase winding, the power converting device comprising:
   a switch connected between the power source and each of the first set of the at least one-phase winding and the second set of at least one-phase winding and switched on or off when controlled;
   a storage that stores a plurality of first energization patterns for the first set of the at least one-phase winding and a plurality of second energization patterns for the second set of the at least one-phase winding,
   each of the plurality of first energization patterns correlating with a corresponding one of a first output torque to be generated by the first set of the at least one-phase winding,
   each of the plurality of second energization patterns correlating with a corresponding one of a second output torque to be generated by the second set of the at least one-phase winding,
   each of the plurality of first energization patterns including at least a first energization duration for the first set of the at least one-phase winding,
   each of the plurality of second energization patterns including at least a second energization duration for the second set of the at least one-phase winding; and
   a controller configured to:
      select, according to a request torque, one of the plurality of first energization patterns and one of the plurality of second energization patterns to determine a combination pattern of the selected one of the plurality of first energization patterns and the selected one of the plurality of first energization patterns accordingly;
      supply a drive pulse signal, whose on duration is based on the determined combination pattern, to the switch to thereby control on-off operations of the switch;
      determine whether the sum of the first output torque and the second output torque is equal to or greater than the request torque;
      when it is determined that the sum of the first output torque and the second output torque is equal to or greater than the request torque, select one of the plurality of first energization patterns and one of the plurality of second energization patterns such that the combination pattern of the selected one of the plurality of first energization patterns and the selected one of the plurality of first energization patterns satisfy that:
         the first output torque and the second output torque is equal to or greater than the request torque; and
         an input current input from the power source to the switch is minimized; and
      select one of the plurality of first energization patterns and one of the plurality of second energization patterns such that a voltage supplied from the power source is maintained to be equal to or higher than a predetermined minimum voltage.

2. The power converting device according to claim 1, wherein:
   the power source, the power converting device, and the rotary electric machine constitute a power converting system; and
   the controller is configured to select, based on change of at least one characteristic parameter in addition to the request torque, one of the plurality of first energization patterns and one of the plurality of second energization patterns,
   the at least one characteristic parameter being indicative of physical characteristics of the power converting system depending on operations of the rotary electric machine.

3. The power converting device according to claim 2, wherein the rotary electric machine has a rotatable rotor, and the at least one characteristic parameter includes at least one of:
   a voltage supplied from the power source;
   an input voltage input to the switch;
   an input current input from the power source to the switch;
   an output current output from the switch to be supplied to a corresponding one of the first set of the at least one-phase winding and the second set of the at least one-phase winding;
   output torque of the rotary electric machine;
   efficiency of the converted power relative to the input power;

a rotational speed of the rotor of the rotary electric machine; and a temperature of each of the rotary electric machine and the power converting device.

4. The power converting device according to claim 1, wherein:

the controller is configured to select one of the plurality of first energization patterns and one of the plurality of second energization patterns such that an input current input from the power source to the switch is maintained to be equal to or lower than a predetermined maximum current.

5. The power converting device according to claim 1, wherein:

the power source, the power converting device, and the rotary electric machine constitute a power converting system; and the controller is configured to, when at least one predetermined condition associated with the power converting system is satisfied, select one of the plurality of first energization patterns and one of the plurality of second energization patterns to determine the combination pattern of the selected one of the plurality of first energization patterns and the selected one of the plurality of first energization patterns accordingly, the first energization duration of the first energization pattern being identical to the second energization duration of the second energization pattern.

6. The power converting device according to claim 1, wherein:

the rotary electric machine has a rotor; and the controller is configured to control at least one of: the duration of the drive pulse signal; and an electrical phase correlation of the rotor relative to one of the at least one-phase winding of the first set and the at least one-phase winding of the second set such that output torque of the rotary electric machine is maintained within a predetermined objective range.

7. The power converting device according to claim 1, wherein:

the rotary electric machine has a rotor; and each of the plurality of first energization patterns and the plurality of second energization patterns is set to one of a non-energization mode, a 120-degree energization mode, and a 180-degree energization mode, the non-energization mode representing a corresponding one of the first and second energization durations being set to zero, the 120-degree energization mode representing a corresponding one of the first and second energization durations being set to 120 electrical degrees of rotation of the rotor, the 180-degree energization mode representing a corresponding one of the first and second energization durations being set to 180 electrical degrees of rotation of the rotor.

8. The power converting device according to claim 2, wherein:

the rotary electric machine has a rotor; and the controller is configured to gradually change, based on change of the at least one characteristic parameter, at least one of:

the duration of the drive pulse signal; and an electrical phase correlation of the rotor relative to one of the at least one-phase winding of the first set and the at least one-phase winding of the second set.

9. The power converting device according to claim 1, wherein:

until a predetermined period has elapsed since: start of energization of at least one of the first set of the at least one-phase winding and the second set of the at least one-phase winding; or reset of the rotary electric machine, the controller is configured to select one of the plurality of first energization patterns and one of the plurality of second energization patterns to determine the combination pattern of the selected one of the plurality of first energization patterns and the selected one of the plurality of first energization patterns accordingly, one of the first energization duration of the selected one of the first energization patterns and the second energization duration of the selected one of the second energization patterns being set to zero.

10. A power converting system comprising:

a rotary electric machine including at least a first set of at least one-phase winding and a second set of at least one-phase winding; and a power converting device for converting input power supplied from a power source, and supplying converted power to the rotary electric machine, the power converting device comprising:

a switch connected between the power source and each of the first set of the at least one-phase winding and the second set of at least one-phase winding and switched on or off when controlled;

a storage that stores a plurality of first energization patterns for the first set of the at least one-phase winding and a plurality of second energization patterns for the second set of the at least one-phase winding, each of the plurality of first energization patterns correlating with a corresponding one of a first output torque to be generated by the first set of the at least one-phase winding, each of the plurality of second energization patterns correlating with a corresponding one of a second output torque to be generated by the second set of the at least one-phase winding, each of the plurality of first energization patterns including at least a first energization duration for the first set of the at least one-phase winding, each of the plurality of second energization patterns including at least a second energization duration for the second set of the at least one-phase winding; and a controller configured to:

select, according to a request torque, one of the plurality of first energization patterns and one of the plurality of second energization patterns to determine a combination pattern of the selected one of the plurality of first energization patterns and the selected one of the plurality of first energization patterns accordingly; and supply a drive pulse signal, whose on duration is based on the determined combination pattern, to the switch to thereby control on-off operations of the switch, determine whether the sum of the first output torque and the second output torque is equal to or greater than the request torque;

when it is determined that the sum of the first output torque and the second output torque is equal to or greater than the request torque, select one of the plurality of first energization patterns and one of the plurality of second energization patterns such that the combination pattern of the selected one of the plurality of first energization patterns and the selected one of the plurality of first energization patterns satisfy that:
the first output torque and the second output torque is equal to or greater than the request torque; and
an input current input from the power source to the switch is minimized; and
select one of the plurality of first energization patterns and one of the plurality of second energization patterns such that a voltage supplied from the power source is maintained to be equal to or higher than a predetermined minimum voltage.

11. The power converting system according to claim 10, wherein the switch is integrated with the rotary electric machine.

12. The power converting system according to claim 11, wherein the controller is integrated with the rotary electric machine.

13. A power converting device for converting input power supplied from a power source, and supplying converted power to a rotary electric machine, the rotary electric machine including at least a first set of at least one-phase winding and a second set of at least one-phase winding, the power converting device comprising:
a switch connected between the power source and each of the first set of the at least one-phase winding and the second set of at least one-phase winding and switched on or off when controlled;
a storage that stores a plurality of first energization patterns for the first set of the at least one-phase winding and a plurality of second energization patterns for the second set of the at least one-phase winding,
each of the plurality of first energization patterns correlating with a corresponding one of a first output torque to be generated by the first set of the at least one-phase winding,
each of the plurality of second energization patterns correlating with a corresponding one of a second output torque to be generated by the second set of the at least one-phase winding,
each of the plurality of first energization patterns including at least a first energization duration for the first set of the at least one-phase winding,
each of the plurality of second energization patterns including at least a second energization duration for the second set of the at least one-phase winding; and a controller configured to:
select, according to a request torque, one of the plurality of first energization patterns and one of the plurality of second energization patterns to determine a combination pattern of the selected one of the plurality of first energization patterns and the selected one of the plurality of first energization patterns accordingly;
supply a drive pulse signal, whose on duration is based on the determined combination pattern, to the switch to thereby control on-off operations of the switch;
determine whether the sum of the first output torque and the second output torque is equal to or greater than the request torque;
when it is determined that the sum of the first output torque and the second output torque is equal to or greater than the request torque, select one of the plurality of first energization patterns and one of the plurality of second energization patterns such that the combination pattern of the selected one of the plurality of first energization patterns and the selected one of the plurality of first energization patterns satisfy that:
the first output torque and the second output torque is equal to or greater than the request torque; and
an input current input from the power source to the switch is minimized; and
when it is determined that the sum of the first output torque and the second output torque is smaller than the request torque, select one of the plurality of first energization patterns and one of the plurality of second energization patterns such that the combination pattern of the selected one of the plurality of first energization patterns and the selected one of the plurality of first energization patterns satisfy that:
an allowable maximum input current supplied from the power source to the power converting device is equal to or greater than the sum of a first output current output from the power converting device to the first set of the at least one-phase winding and a second output current output from the power converting device to the second set of the at least one-phase winding; and
the sum of the first output torque and the second output torque is maximized.

* * * * *